United States Patent [19]
Miklovic

[11] Patent Number: 5,680,371
[45] Date of Patent: Oct. 21, 1997

[54] BROADBAND SONAR METHOD AND APPARATUS FOR USE WITH CONVENTIONAL SONAR ARRAYS

[75] Inventor: Donald W. Miklovic, San Diego, Calif.

[73] Assignee: Arete Engineering Technologies Corporation, San Diego, Calif.

[21] Appl. No.: 509,156

[22] Filed: Jul. 31, 1995

[51] Int. Cl.⁶ ..................................................... G01S 3/86
[52] U.S. Cl. ............................ 367/123; 367/103; 367/119
[58] Field of Search ................................. 367/103, 119, 367/121, 123

[56] References Cited

U.S. PATENT DOCUMENTS

| | | | |
|---|---|---|---|
| 3,852,707 | 12/1974 | Autrey | 367/126 |
| 4,112,430 | 9/1978 | Ladstatter | 367/135 |
| 4,170,766 | 10/1979 | Pridham et al. | 367/123 |
| 4,173,007 | 10/1979 | McKeighen et al. | 367/11 |
| 4,290,127 | 9/1981 | Pridham et al. | 367/123 |
| 4,336,607 | 6/1982 | Hill et al. | 367/123 |
| 4,544,927 | 10/1985 | Kurth et al. | 343/373 |
| 4,955,003 | 9/1990 | Goldman | 367/125 |
| 5,383,164 | 1/1995 | Sejnowski et al. | 367/134 |
| 5,444,443 | 8/1995 | Umeda et al. | 367/123 |

FOREIGN PATENT DOCUMENTS

| | | | |
|---|---|---|---|
| 2097121 | 10/1982 | United Kingdom | 367/123 |

OTHER PUBLICATIONS

Thurstone et al., "A new ultrasound imaging technique employing two-dimensional electronic beam steering", Dept. of Biomedical Engineering, Duke University Jun. 27, 1978.

*Primary Examiner*—Ian J. Lobo
*Attorney, Agent, or Firm*—John L. Rogitz

[57] ABSTRACT

A broadband sonar system in which a broadband output from a conventional narrowband sonar sensor array is used to capture broadband acoustical input signals. A single broadband beamformer receives the input from each of the sensors (such as hydrophones) of the array. The broadband output signal from each sensor of a particular subarray is coupled to a corresponding one of a plurality of first filters. Each first filter emphasizes those frequencies of each subarray which have the least noise. In addition, the output is attenuated for frequencies below the design frequency, with lower frequencies being attenuated to a greater degree than higher frequencies. A plurality of second and third filters, each corresponding to a subarray, are provided to compensate for the effects of the frequency and sensor spacing on the signal as the beam rotates. In the preferred embodiment of the present invention, the second filters attenuate certain channels as the beam approaches broadside in a manner that provides near optimum performance. The transfer function of each of the second filters remains constant over a range of beam angles computed by a sector allocation processor. When the beam angle being computed is outside the range, a new transfer function is presented to each second filter by the sector allocation processor. The outputs of all of the channels are presented to a single broadband focused sector beamformer which sums the outputs from each channel in accordance with a beamforming algorithm.

35 Claims, 13 Drawing Sheets

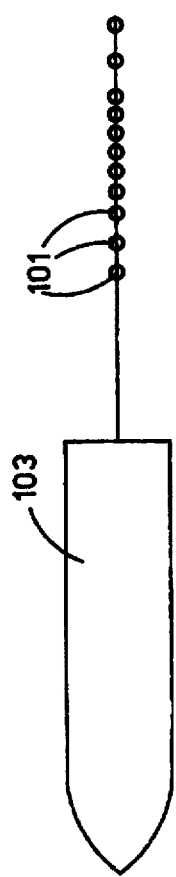
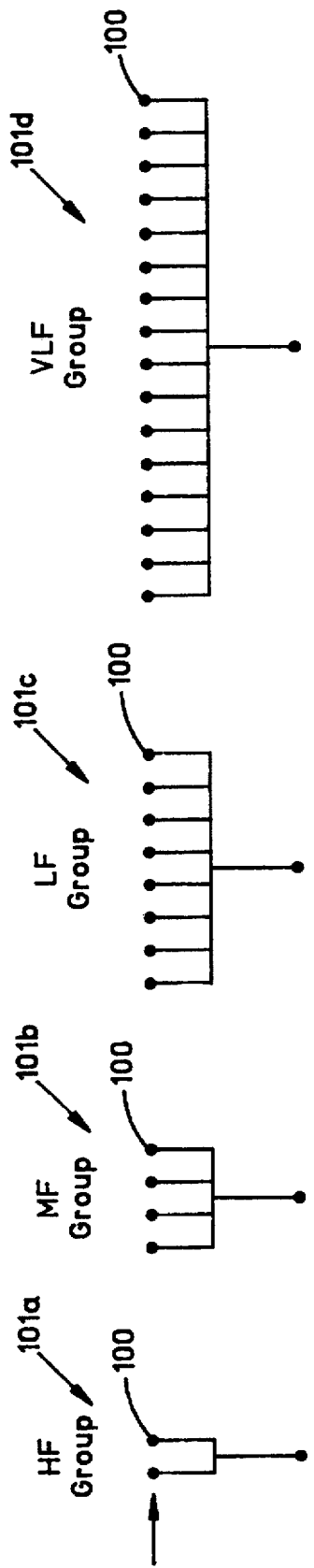

3 dB full width = 4.2 deg.

BROADBAND SONAR METHOD AND APPARATUS FOR USE WITH CONVENTIONAL SONAR ARRAYS

BACKGROUND OF THE INVENTION

1. Field of the Invention

This invention relates to broadband sonar and more particularly to a method and apparatus for processing broadband sonar input signals received from a conventional sonar sensor array.

2. Description of Related Art

Sonar systems which receive and process sound waves in order to determine the location of objects submerged in water are currently in wide use. Sonar systems may be either passive or active. In active systems, sound is emitted from a source within the sonar system. Characteristics of objects which reflect the emitted sound are then determined from the echo. In a passive sonar system, no sound is emitted. Rather, the sensor array is used to detect sound that emanates from a remote source, such as another ship. Both active and passive sonar systems rely upon the fact that sound waves emanate from a point. By determining the difference in the phase of the signals received at different locations along a sensor array, the bearing of the origin of the sound may be determined.

In active systems, sound is emitted from the source in the form of a pulse. By measuring the delay between the time the pulse is sent and the time the echo is received, the contact can be localized to an ellipsoid with the source and receiver as foci. For co-located target and receiver (a monstatic geometry), the ellipse becomes a sphere whose radius is the range to the target. Combining this information with bearing information localizes a point of contact between the sound wave and an object (i.e., the "contact").

In passive systems, localization can sometimes be done by using the shape of the signal determined at the array (i.e., wavefront curvature as determined by measurements of phase delay between signals received at various locations along a sensor array). This can be done if the source of the sound is close to the array (in the nearfield), since the radius curvature of the wavefront becomes too great to measure when the target is at greater distances. Therefore, for targets that are not in the nearfield, passive systems can not typically determine distance in the same manner as active systems, and are typically limited to estimating bearing.

FIG. 1 is an illustration of a vessel towing a sonar sensor array. Sensors 101 capable of converting sound waves into electrical signals are often towed behind a vessel 103. Each individual sensor is capable of receiving broadband acoustic inputs. However, sensor arrays and the associated processing circuitry are typically designed for acoustic inputs in a narrow range of frequencies near one or more "design" frequencies. For example, it is common for sensors to be spaced (or "cut") at one half the acoustic wavelength of the design frequency in a one-dimensional array. When systems are required to cover a wide range of frequencies (more than a factor of two), several "subarrays" are used, each having a different design frequency. These design frequencies are usually multiples of the lowest frequency of interest (e.g., $f_o$, $2f_o$, $4f_o$, $8f_o$, etc.).

FIG. 2a is an illustration of one example of the placement of sensors along a sonar sensor array 201 in which four subarrays 202, 203, 205, 207 are provided. FIG. 2b is an illustration of the grouping of sensors 100 within each subarray 202, 203, 205, 207 of the array 201 is shown. In some systems, sensor 100 may be equally spaced. However, the particular sensors 100 that are included within each sensor group 101 determine the spacing of the groups 101. For example, in FIG. 2b, two adjacent sensors 100 are grouped to form a sensor group 101a associated with the high frequency subarray 207. In some arrays, each output 102 of each individual sensor 100 is available. These same two sensors 100 are grouped together with another two adjacent sensors 100 to form a sensor group 101b associated with the mid-frequency subarray 205. These four sensors 100 are also grouped together with an adjacent four sensors 100 to form a sensor group 101c associated with low frequency subarray 203. These eight sensors 100 are grouped together with another eight sensors 100 to form a sensor group 101d associated with the very low frequency subarray 202.

In one example, the very low frequency subarray 202 includes sensors 100 spaced approximately 3.25 meters apart (measured from the center, or mean position, of the group 101). Thus, the design frequency of the subarray 202 is approximately 200 Hz. The low frequency subarray 203 includes sensor groups 101 spaced approximately 1.625 meters apart (measured from the center, or mean position, of the group 101). Thus, the design frequency of the subarray 203 is approximately 400 Hz. The mid-frequency subarray 205 comprises sensor groups 101 spaced 812.5 mm apart. Accordingly, the design frequency of the mid frequency subarray 205 is approximately 800 Hz. The high frequency subarray 207 comprises sensor groups 101 spaced 406.25 mm apart. Accordingly, the design frequency of the high frequency subarray 207 is approximately 1600 Hz.

The spacing of the sensor groups 101 results in ambiguity in the bearing of the acoustic signal at frequencies above the design frequency due to the periodic nature of the received signal. At frequencies below the design frequency, the "array gain" begins to degrade, since the distance between each sensor becomes less than ½ the wavelength. Array gain is:

$$(S/N_A)/(S/N_S)$$

where $S/N_A$ is the signal-to-noise ratio for the entire array after processing the outputs from each sensor, and $S/N_S$ is the signal-to-noise ratio for any one particular sensor before processing. Due to the degradation in the array gain at low frequencies and the inability to determine bearing at high frequencies, a particular subarray is typically used only in a small range of frequencies below $f_m$, such as $½f_m$ to $f_m$, where $f_m$ is the design frequency of a particular subarray. Even in this narrow band, the array gain is typically at least 3 dB less at the lowest frequencies (i.e., near $½f_m$) than at the design frequency.

Beamforming is a technique that combines sensors in an array to both reduce noise and to determine the bearing of a sound source. The source may be either a passive or active source. A beam is formed by adding the output of sensors in a way that enhances signals which are coming from a certain bearing (the beam direction) while canceling noise and signals coming from other directions. This is done by effectively time delaying the data on each channel by the amount required to make the signal occur at the same time or be in phase on each channel. The delayed signals are then summed together over the channels. If the sound source is far from the array, then these delays depend only on the direction or bearing of the source relative to the array. If the source is near enough to the array to be considered in the near field, these delays also depend on the range of the sound source. Accounting for range is referred to as "focused beamforming". Many beams can be formed in order to detect signals arriving from different directions. The sound that originates from a particular sound source "peaks up" in the beam that is formed in the direction of the source. That is, the energy which is attributable to the source and is greater in the beam that is directed toward the source than the other beams. Accordingly, the bearing of the source is determined by noting which beam has the most energy from that source. For equally spaced arrays, all beams may be formed simultaneously using a Fast Fourier Transform (FFT) to perform the required delays. For uniformly spaced arrays, beamforming is usually not implemented above the design frequency because the beam direction becomes ambiguous.

Towed arrays typically employ a hydrophone group for each channel to reduce flow noise and other non-acoustic noises. This group comprises hydrophones spaced within in an area less than ¼ of an acoustic wavelength at the design frequency. Each of the hydrophones of a group are summed together in phase. Because of the close spacing of these sensors, the grouping has almost no effect on the acoustic signals, and need not be figured into the beamforming process.

FIG. 3 is an illustration of a sonar system used to process a plurality of subarrays 203, 205, 207. The signals received from each subarray 203, 205, 207 are processed by a Subarray Processing Circuit 300 comprising a filter 301, a beamformer 303, a post processor 305, and a display 307. Three such Subarray Processing Circuits 300 are shown in FIG. 3. Each filter 301 is a bandpass filter tuned to pass only the frequencies of interest (e.g., the frequencies in the range of ½$f_n$ to $f_n$, where $f_n$ is the design frequency of the $n^{th}$ subarray). FIG. 4 is a graphical representation of the array response for a broadside beam in azimuth output from one such Subarray Processing Circuit 300 of a prior art system, such as the system shown in FIGS. 2 and 3.

Systems such as the system shown in FIGS. 1–3 can only effectively treat narrowband signals. In fact, even though such systems have the ability to process more than one band of frequencies, each narrow band is often individually displayed. In some such systems, a switch is provided that allows the operator to toggle between the available displays. Alternatively, some systems have three display devices that constantly display all three outputs. Only signals in a limited frequency band are processed by each particular Subarray Processing Circuit 300. However, bandwidth is directly related to temporal resolution. As stated above, in active sonar, delay in the time required to receive an echo (i.e., travel time) is used to determine range. Therefore, greater temporal resolution is equivalent to greater range resolution capability. Accordingly, limitations in bandwidth are equivalent to limitations in the resolution of range measurements.

Temporal resolution is also important in passive sonar systems. For example, greater temporal resolution improves signal-to-noise ratio and provides greater ability to characterize contact details for recognition and classification of objects. In addition, multipath effects can be measured with greater accuracy and thus distortion due to such multipath effects can be reduced.

Sensors typically receive broadband inputs, but existing systems only use a portion of that available information in each channel. Therefore, the best possible performance is not achieved. Specifically, the array gain and azimuthal resolution is significantly lower than is theoretically possible. In many applications, the realized array gain is 5–10 dB less than the maximum array gain that is theoretically achievable. The realized azimuthal resolution is typically at least 5–10 times less than is theoretically possible. This inefficiency means that for any given array gain and azimuthal resolution, more sensors and channels are used in the prior art than are required. Still further, the information that is present in the frequencies above the highest design frequency is not processed at all. There are many applications where the higher frequencies are highly desirable.

Therefore, it would be desirable to provide a broadband sonar system in which a relatively large portion of the frequency spectrum were processed in each channel in order to increase both the azimuthal resolution and the array gain. It would also be desirable if such a system used a conventional sensor array.

SUMMARY OF THE INVENTION

The present invention is a broadband sonar system which uses a broadband output from a conventional sonar sensor array designed with multiple subarrays for use in a narrowband sonar system to capture acoustical input signals which are then processed by a broadband beamformer. A single broadband beamformer receives the input from each of the sensors (such as hydrophones) of the array. In the preferred embodiment of the present invention, the broadband output signal from each sensor group (i.e., each "channel") of a particular subarray is coupled to a corresponding one of a plurality of first filters. Each first filter corresponds to one of the subarrays and has a transfer function that depends upon frequency and the spacing of the sensors within the group of the corresponding subarray, but which is independent of beam direction. The first filters compensate for differences in the amount of frequency dependent "channel noise" from subarray to subarray. The transfer function de-emphasizes those frequencies of a subarray which contribute the most to channel noise.

Channel noise is power that appears at the output of a channel as a consequence of the constructive and degenerative interference between signals received at the different sensors of a sensor group and which is not associated with a specific source of sound. Such constructive and degenerative interference occurs when the outputs from sensors are combined.

Each filter accents the subarray channel at frequencies above the design frequency, with higher frequencies being accented to a greater degree than lower frequencies. Such accentuation reduces the emphasis of channels which have higher noise due to the closer spacing of sensors within a group relative to the acoustic wavelength, and thus enhances the overall array performance.

A plurality of second filters, each corresponding to a subarray, are preferably provided having a transfer function that is dependent upon the beam angle (i.e., the direction that the beamformer is attempting to compute), frequency, and the spacing of the sensors within the corresponding subarray. Each second filter compensates for directionally dependent effects as the beam rotates. In the preferred embodiment of the present invention, the second filters attempt to compensate for two difference effects. The first effect is the difference in the signal strength from subarray to subarray that results from the hydrophone grouping and which is dependent upon frequency, beam angle, and spacing of the sensors of the subarray groups. Thus, the second filter de-emphasizes the outputs from channels of a subarray which have less signal strength off broadside beam angles by attenuating these channels as the beam approaches endfire (i.e., 90° from broadside) in a manner that provides near optimum performance. By attenuating these signals, the amount of noise that is contributed by them is also reduced, further enhancing the array performance.

The second effect for which the second filters compensate is the difference in spacing between the channels for different subarrays. The second filters suitably attenuate frequencies lower than the associated design frequency to compensate for the fact closely spaced sensors effectively collect the same information. This filter depends on frequency, channel spacing, and beam direction.

In the preferred embodiment of the present invention, the transfer function of each of the second filters remains constant over a range of beam angles computed by a sector allocation processor. When the beam angle being computed is outside the range, a new transfer function is presented to each second filter by the sector allocation processor. In one embodiment of the present invention, the new transfer function is presented by changing a parameter of the transfer function.

The outputs of all of the channels, having been weighted over a broad range of frequencies to account for differences in the array gain of each subarray at each received frequency, are presented to a single broadband focused sector beamformer which sums the outputs from each channel after applying relative delays to the outputs from each channel that are equal to amount of time required for the received signal to have traveled through medium (e.g., water) from a point in space within the medium to a sensor associated with that channel, thus forming a pixel to be displayed. Each other pixel of interest is calculated in this manner to form a complete image.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE FIGURES

FIG. 1 is an illustration of a conventional sonar sensor array being towed by a vessel;

FIGS. 2a–2e illustrate one example of the placement of sensors along a conventional sonar sensor array in which four subarrays are provided;

Like reference numbers and designations in the various drawings refer to like elements.

DETAILED DESCRIPTION OF THE PREFERRED EMBODIMENTS

Throughout this description, the preferred embodiment and examples shown should be considered as exemplars, rather than limitations on the present invention.

Functional Description of the Present Invention

The present invention is a broadband sonar system in which a "conventional narrowband sensor array" 201 (such as a narrow band sonar sensor array) is preferably used. In an alternative embodiment of the present invention, a sensor array which is specifically designed to take advantage of the attributes of broadband signal processing is used. The ability to use a conventional narrowband sensor array in a broadband sonar system allows existing systems to be relatively inexpensively retrofitted to perform superior broadband processing. A conventional narrowband sensor array is an array of sensors (such as hydrophones used in a sonar system) which includes a plurality of "subarrays" 203, 205, 207. Each sensor within a narrowband sensor array is capable of receiving signals (such as acoustical signals) over a relatively broad frequency spectrum (such as 50 to 800 Hz in the case of a sonar system). A subarray 203, 205, 207 is a plurality of sensor groups 101 which are equally spaced apart. Each sensor group includes one or more sensors that are within ¼ wavelength at the design frequency for the subarray of which the sensor group 101 is a part. The output of each sensor group 101 summed in phase is a channel. For the purpose of the present description, the distance between a first and second sensor group 101 is the distance between the center (mean position) of the first physical group of sensors and the mean position of the second physical group of sensors.

The present invention relies on the fact that, even though narrow band signals are ambiguous when the frequency of the received signals is greater than the design frequency, these ambiguities are eliminated if the input signal has sufficient bandwidth. In accordance with the present invention, all the sensors are used over an entire broad range of frequencies. Thus, the array gain at the higher frequencies is significantly improved, since more independent samples are being used. That is, sensors which are part of a low frequency subarray provide additional information at the higher frequencies. Also, using the low frequency array at higher frequencies provides a much larger aperture in terms of acoustic wavelengths. This leads to much better azimuthal resolution.

Figure 2A:
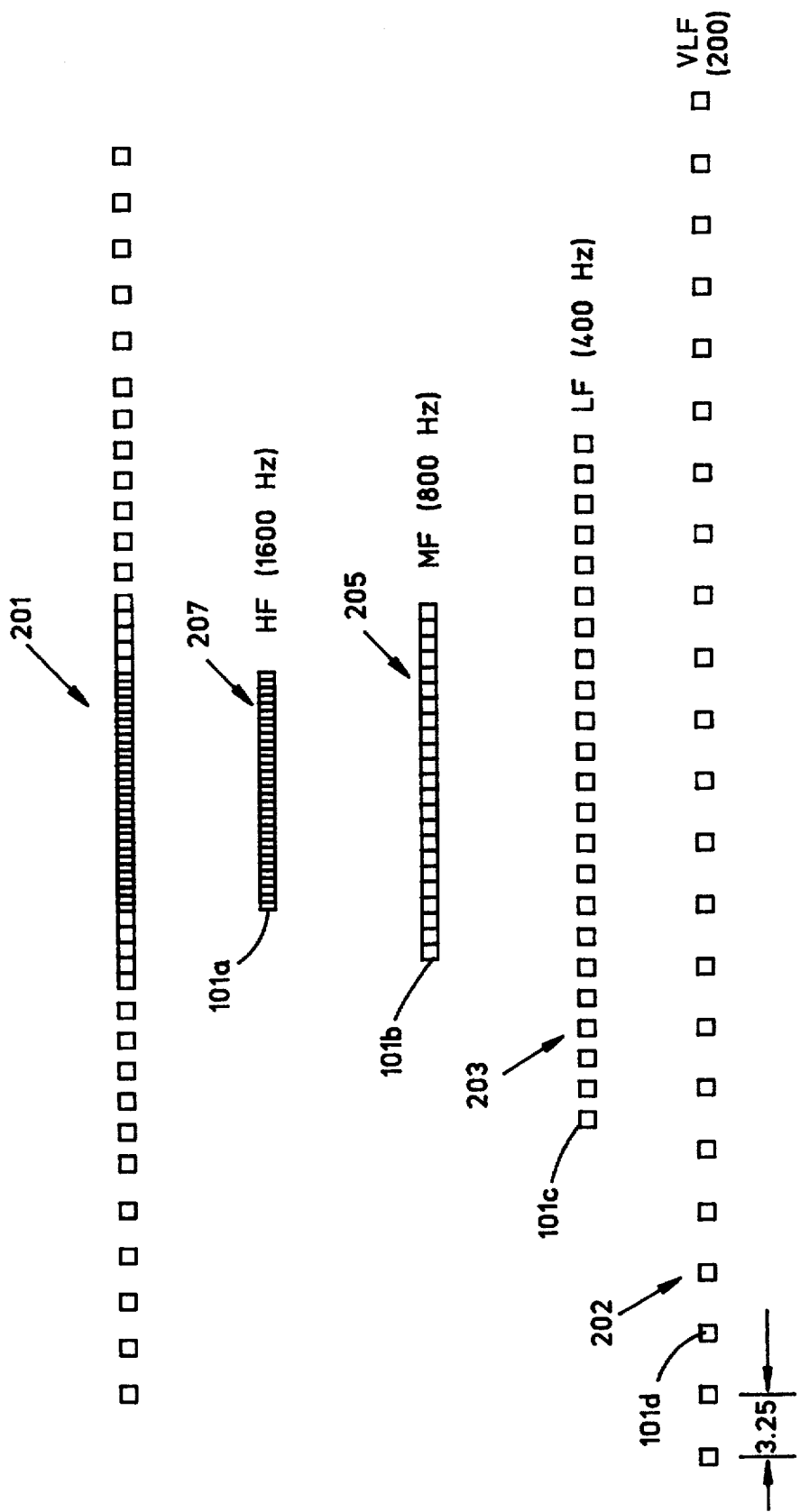
Figure 3:
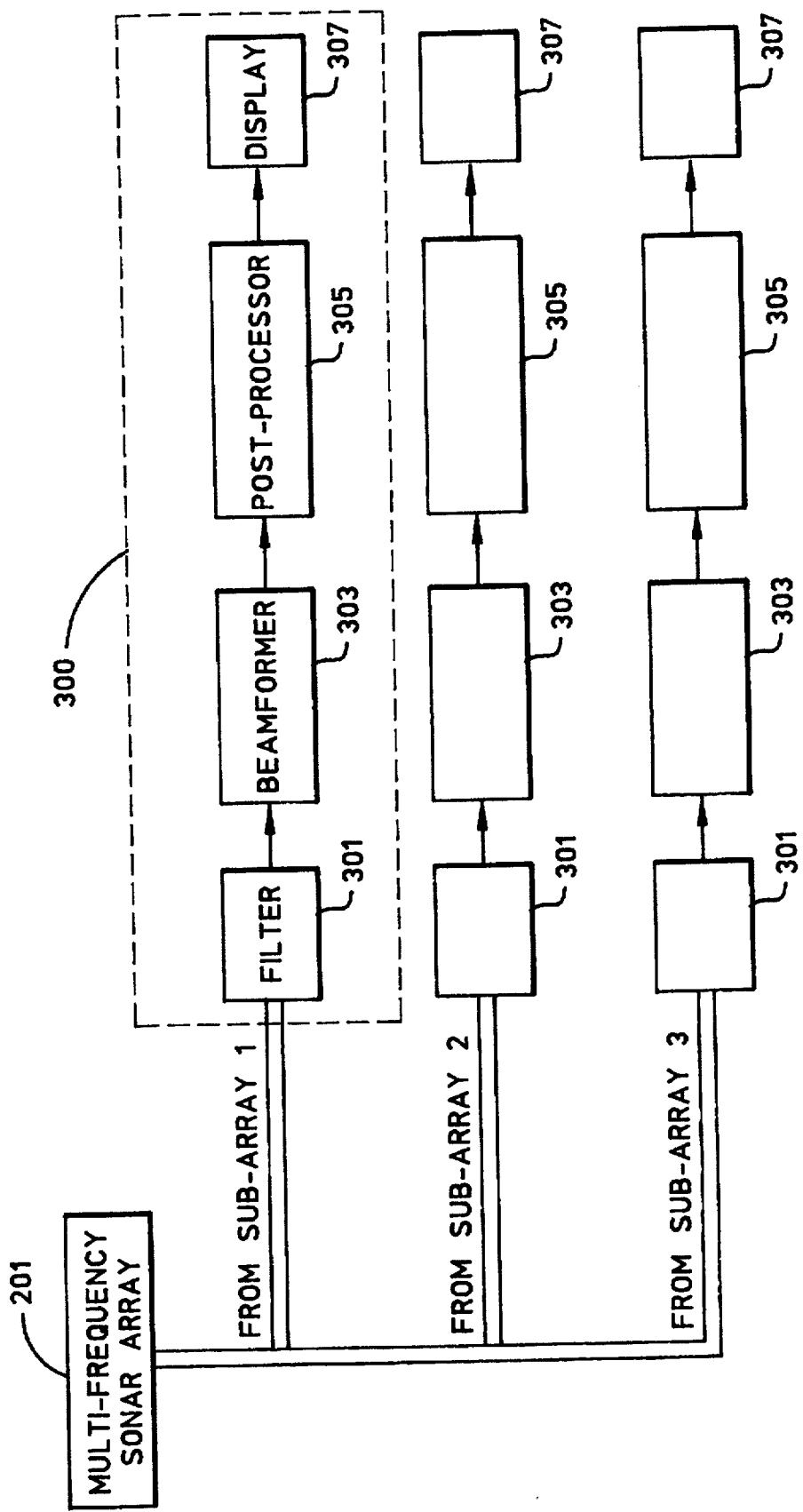
FIG. 3 is an illustration of a prior art sonar system used to process a plurality of subarrays.

FIG. 5 is a functional block diagram of the present invention. In accordance with the preferred embodiment of the present invention, a plurality of Noise Compensating ("NC") filters 501 are provided. The number of NC filters 501 is preferably equal to the number of channels within the array. Each NC filter 501 preferably corresponds one to one with a unique channel of one subarray 203, 205, 207 (see FIG. 2). Each NC filter 501 associated with a channel of the same subarray will preferably have the same transfer function. Accordingly, for the sake of simplicity, a single block is shown in FIG. 5 to represent all of the filters 501 that are coupled to the channels of one subarray. "Self" noise is reduced by summing together in phase outputs of each sensor of a sensor group to form a channel. Sensors within a sensor group 101 are typically spaced less than ¼$\lambda$, where $\lambda$ is the wave length of the design frequency. It is well known to sum a plurality of closely spaced sensors together in order to increase the signal-to-noise ratio (SNR), since the acoustic signals from each sensor will reinforce one another, while the non-acoustic noise is random. It will be understood that a sensor group 101 may have any number of sensors, including a single sensor. Each NC filter 501 is preferably associated with a unique corresponding Spacing compensating SpC filter 502, are provided to compensate for differences in the spacing of sensors within sensor groups 101 associated with different subarrays. The output of each SpC filter 502 is coupled to an input to an associated Signal Compensation ("SC") filter 503, such that there is a one to one correspondence between each NC filter 501, SpC filter 502, SC filter 503, and channel. The output from each SC filter 503 is coupled to a focused sector beamformer 505.

Figure 6:
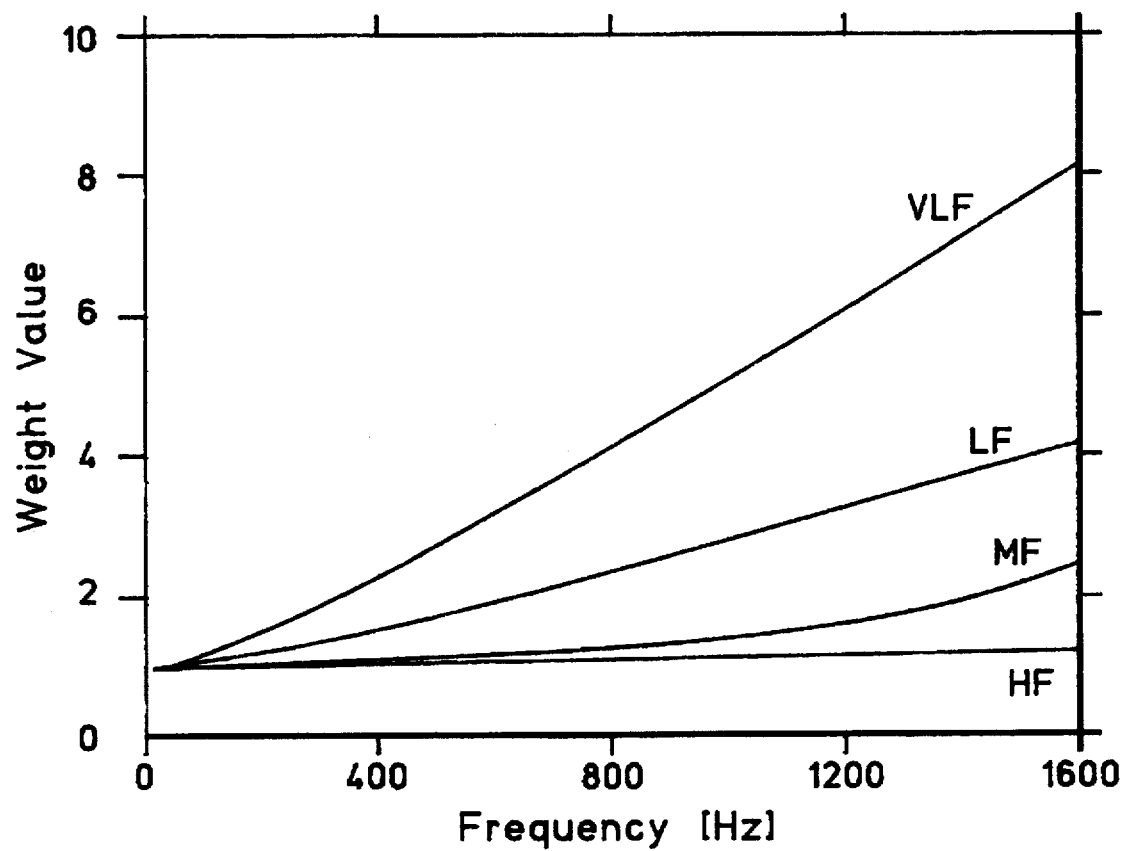
FIGS. 6 is a graph of an NC filter transfer function in accordance with one embodiment of the present invention.

In the preferred embodiment of the present invention, each NC filter 501 adjusts the output level of a corresponding sensor group to compensate for differences in the amount of noise expected at the channel (i.e., channel noise) as a consequence of the different group configurations in each subarray. That is, noise is a function of the number of sensors, their spacing, and the frequency of the signals received by the sensors. Therefore, sensors from different subarrays will contribution differently to channel noise as a function of frequency. The NC filters 501 adjust the output level of each sensor group 101 to compensate for these differences. By decreasing the output at frequencies that contribute more to channel noise, the overall array gain is improved. Since the sensor spacing is the same for sensor groups 101 within the same subarray, the same transfer function is used in each NC filter 501 associated with each sensor group 101 of the same subarray. In one embodiment of the present invention, the NC filters 501 each have a transfer function essentially equal to $1/P(f)$, where $P(f)$ is the amount of noise power anticipated. The noise power of a channel is directly dependent upon the electrical gain of the channel (i.e., the higher the gain, the higher the noise). We assume channels have been normalized so that they all have the same electrical gain. In the preferred embodiment of the present invention, the transfer function of each NC filter 501 is the inverse of the directivity index of each sensor group within the subarray associated with that NC filter 501. The directivity index is a function of frequency and sensor spacing. In accordance with statistical calculations well known in the art, the inverse of the array gain for a sensor group as a function of frequency is:

$$N_G^2 / \left\{ N_G + 2 \sum_{n=1}^{N_G-1} \{(N_G - n)\text{sinc}[2f(x_n - x)/c]\} \right\}$$

where sinc $a = (\sin \pi a)/(\pi a)$; $x_n$ is the position of the $n^{th}$ sensor within the sensor group; x=the center of the hydrophone group; $N_G$ is the number of sensors in the group; f=the frequency in cycles; and c=the speed of sound through the medium surrounding the array. In accordance with likelihood theory, NC filters 501 having this transfer function are nearly optimal for Gaussian isotropic noise. Since the overall process is linear, any filter having a transfer function proportional to this transfer function is equally effective. Furthermore, the purpose of the NC filters 501 is to compensate for the differences in the directivity index from one sensor group configuration to another. Therefore, any filter transfer function that generally tracks the inverse of the differences in the directivity index from one sensor group to another may be used. Furthermore, in an alternative embodiment of the present invention, the NC filter 501 is not necessary. That is, in some limited applications it may not be essential to have the gain of each channel optimized. Therefore, the reduction in complexity attained by not including the NC filter 501 may be justifiable. Even in an embodiment of the present invention which does not have an NC filter 501, the azimuthal resolution is likely to be improved over prior art narrowband systems. FIGS. 6 is a plot of the filter response of the four subarrays of FIG. 2. These transfer functions are provided as examples of the transfer functions that may be useful in the present invention. However, these particular transfer functions are provided only as exemplars and should not be taken as a statement of exclusion. That is, any transfer function that results in a plot that is similar to the plots shown in FIGS. 6 would be adequate.

Figure 5A:
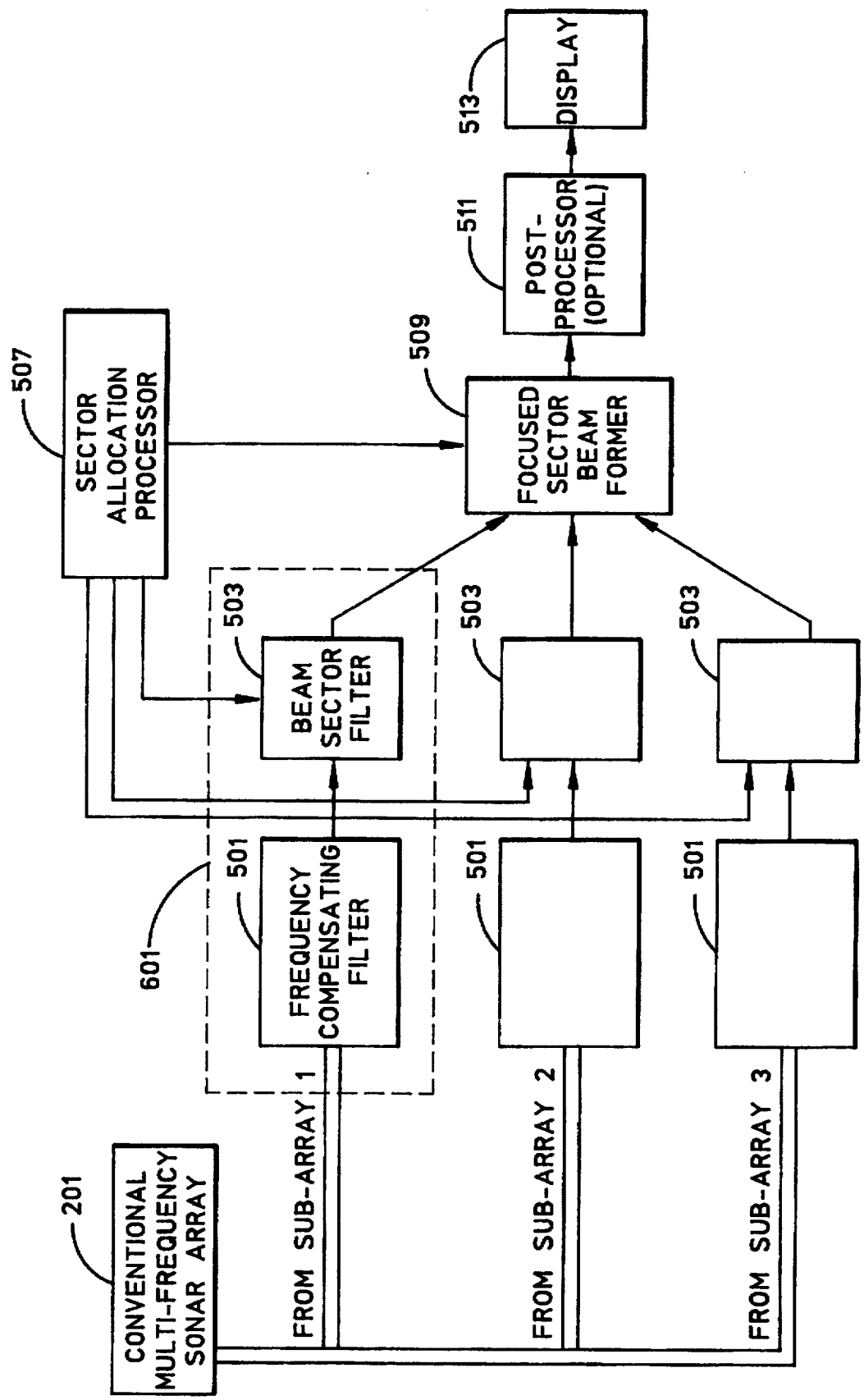
FIG. 5a and 5b are functional block diagrams of a broadband sonar system in accordance with the present invention.
Figure 5B:
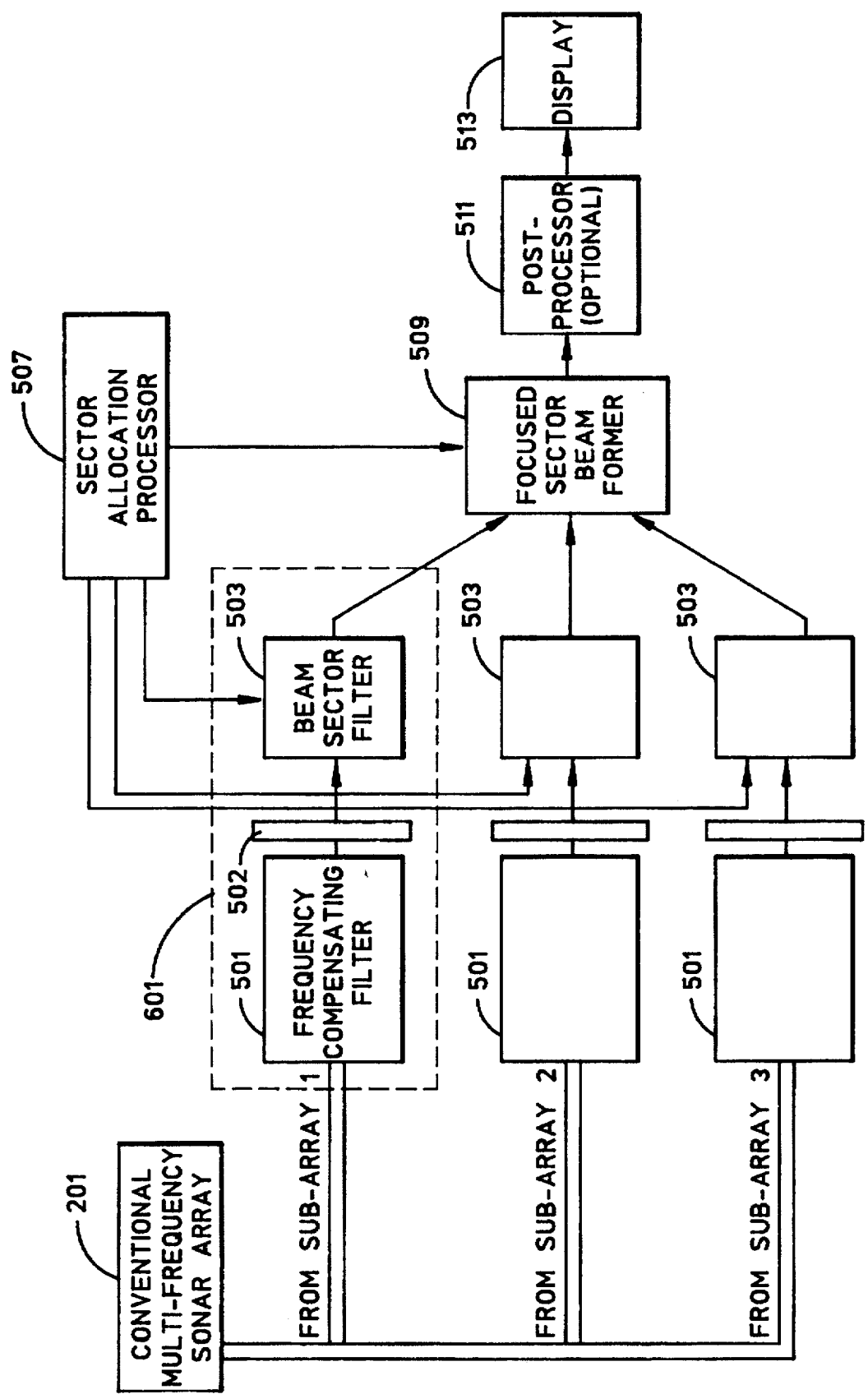
Figure 7A:
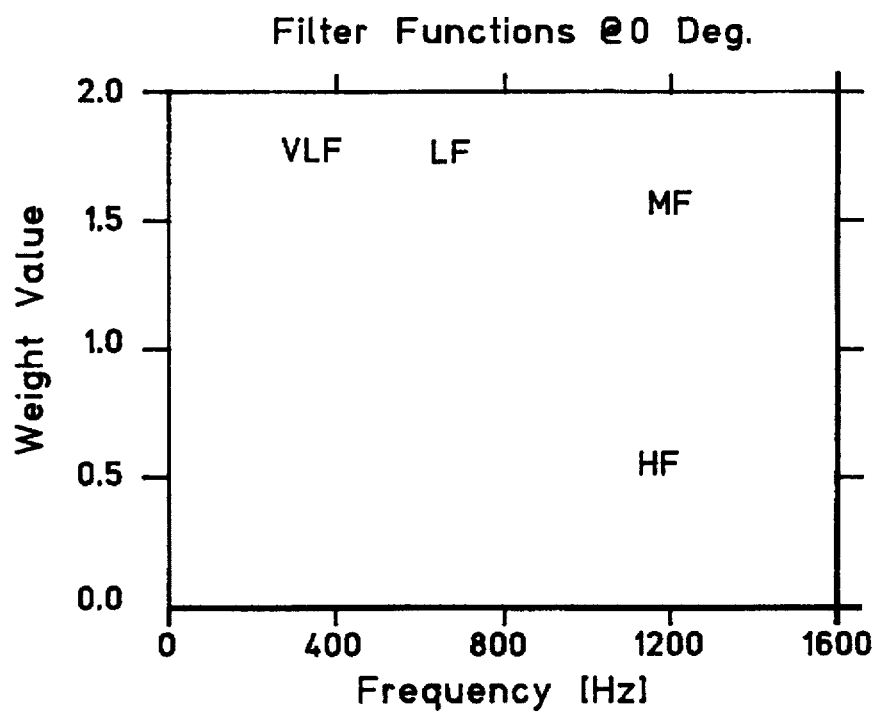
FIGS. 7a–7b are graphs of an SpC filter transfer function in accordance with one embodiment of the present invention taken at two particular beam angles.
Figure 7B:
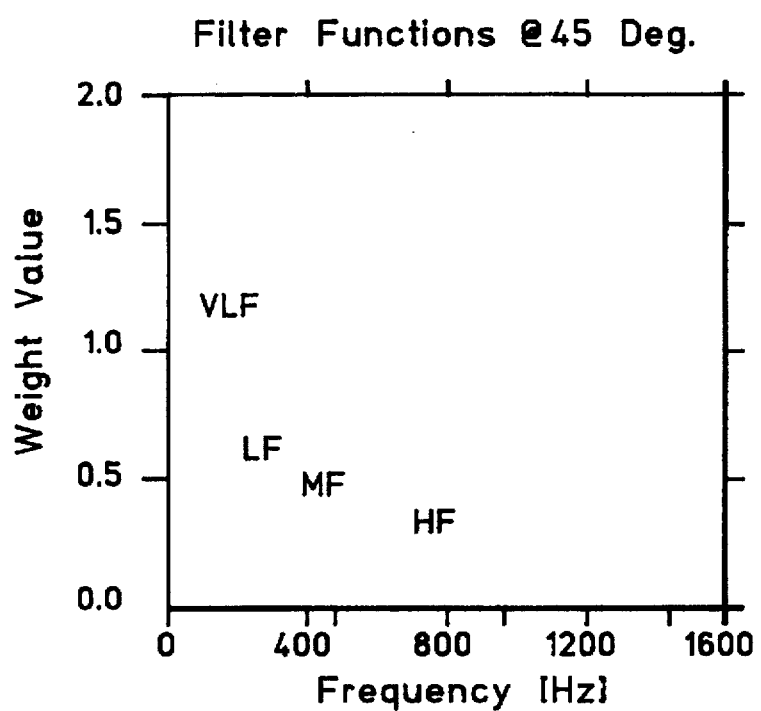

In the preferred embodiment, the SpC filter 502 compensates for the difference in the relative spacing of each of the sensor groups 101 with respect to the frequency (wavelength) and direction of the received signal. In one embodiment of the present invention in which the SpC filter 502 is not dependent upon the angle of the beam, the SpC filter 502 attenuates frequencies below the design frequency $f_m$ by a factor of $f/f_m$. Above the design frequency, the gain of the SpC filter 502 is 1. This SpC filter 502 reduces the effect of each channel at frequencies lower than the design frequency for that channel. The SpC filter 502 prevents the high frequency channels from being over emphasized by the beamformer at the lower frequencies. This can be understood by noting that the sensor spacing of the highest frequency subarray is ⅛ the wavelength of the lowest frequencies of the low frequency subarray in an array with three subarrays. Accordingly, at low frequencies, adjacent sensor groups are essentially detecting the same signal (i.e., the difference in the phase of the signal is of little significance). Such over emphasis of the low frequencies degrades low frequency array gain. In one embodiment of the present invention, the transfer function of the spacing compensation filter 502 is dependent upon the angle of the beam as well as frequency. For example, in one embodiment of the present invention, the transfer function of the spacing compensation filter 502 is:

$$N_{SA} / \left\{ N_{SA} + 2 \sum_{n=1}^{N_{SA}-1} (N_{SA} - n)\cos(2\pi n U \Delta X)\text{sinc}\left(\frac{2\pi f}{c} \Delta X\right) \right\}$$

Where $N_{SA}$=number of channels in the subarray; $\Delta X$=spacing of the channels in the subarray; $U=\cos \theta$; $\theta$=the beam angle with respect to broadside. By providing a transfer function that is dependent upon both frequency and beam angle, additional performance can be achieved. FIG. 7 is a plot of the transfer function for the SpC filter 502 in accordance with one embodiment of the present invention. In an alternative of the present invention shown in FIG. 5b, the SpC filter 502 of FIG. 5a is not provided. It will be understood by those of ordinary skill in the art that both the NC filter 501 and the SpC filter 502 may have any transfer function that compensates for the differences between signal strength at different sensors as a function of beam angle and frequency. For example, an adaptive filter may be provided in which a processor characterizes the array gain as a function of beam angle and frequency and iteratively determines the parameters of the filter based upon the characterization of the array gain.

Figure 8A:
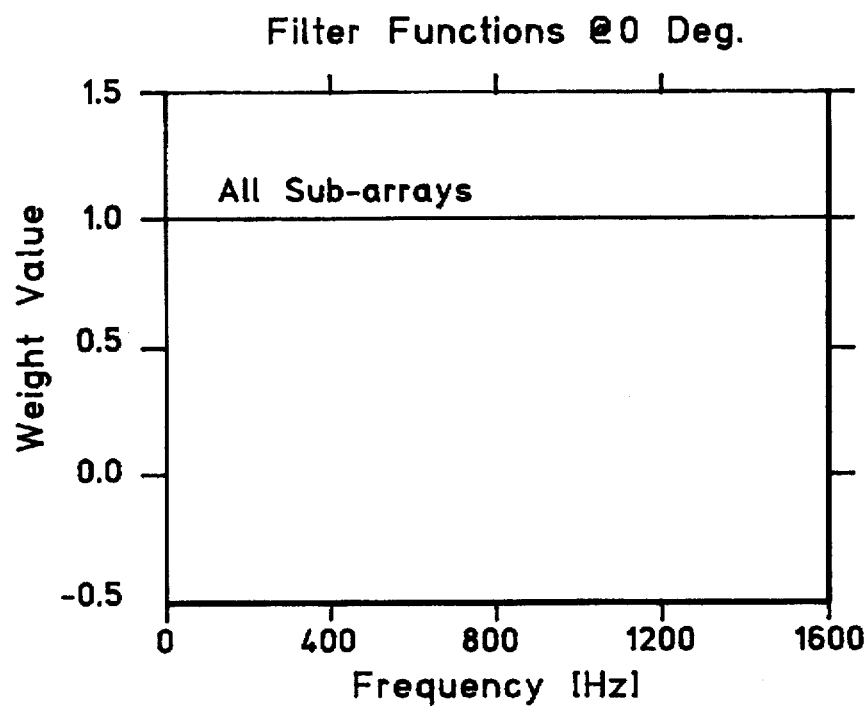
FIG. 8a–8b are graphs of an SC filter transfer function in accordance with one embodiment of the present invention taken at two particular beam angles.
Figure 8B:
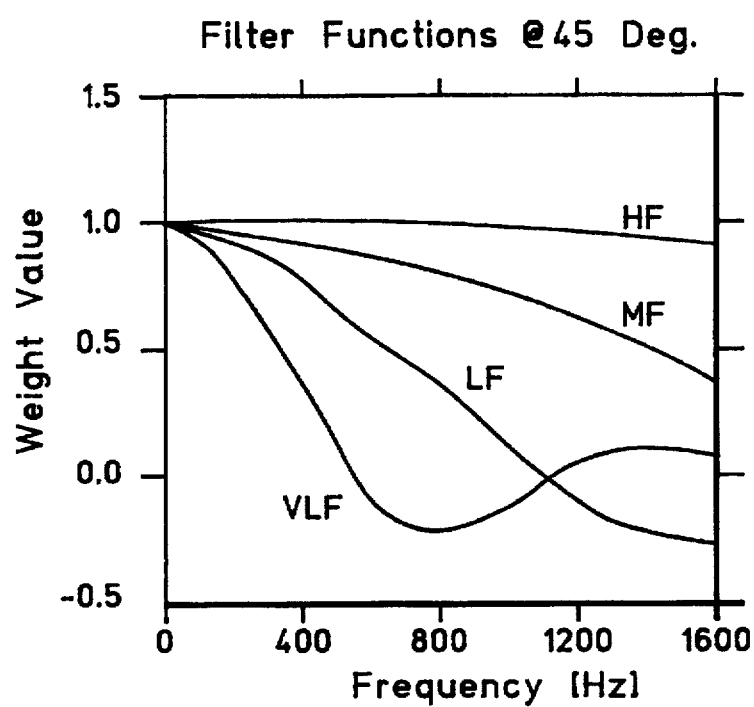

In the preferred embodiment of the present invention, each SC filter 503 compensates for the effects of the sensor group 101 on the signal. That is, higher frequency signals off broadside are attenuated more than lower frequency signals. In fact, in some cases, the sign of the channel may even change. This effect is less pronounced as the beam approaches broadside. Due to this effect, using all channels equally for all beams degrades the results. Accordingly, the SC filter 503 accents selected channels as the beam approaches endfire in a manner that gives near optimum performance. In accordance with the preferred embodiment of the present invention, the transfer function of each SC filter 503 is the complex conjugate of the signal out of the sensor group, having the form:

$$(1/N_G) \sum_{n=1}^{N_G} \Sigma e^{-j2\pi(f/c)\sin\theta(x_n - x)}$$

where $N_G$ is the number of sensors in each sensor group, f is the frequency in Hertz, c is the speed of sound within the medium surrounding the array, θ is the bearing of the beam angle relative to broadside, $x_n$ is the position of the $n^{th}$ sensor with the sensor group and x is the average of all $x_n$. In an alternative embodiment of the present invention, no SC filter 503 is provided. FIGS. 8a–8b illustrate the directivity index of the SC filter 503 for various transfer functions.

In the preferred embodiment of the present invention, the SC filter 503 and the SpC filter 502 receive information regarding the beam direction (i.e., "θ") from a Sector Allocation ("SA") processor 507. The SA processor 507 also provides information to a focused sector beamformer 509 to coordinate beam formation with the SC filters 503 and the SpC filter 502. In accordance with one embodiment of the present invention, the value θ is preferably provided in regular increments (i.e., over sectors which range from θ–y to θ+y over which the SC filter 503 can be assumed to be independent of the beam angle) where y is chosen to ensure that the difference between the operation of the SC filters 503 at the θ–y to θ+y does not greatly differ from the operation of the SC filters 503 at θ (i.e., the mis-match loss resulting from not using the exact angle of the beam in the SC filter 503). In accordance with one embodiment of the present invention, the following formula is applied to determine the mis-match loss at angle θ for filters designed for angle $\theta_k$ as a function of frequency:

$$L(\theta,\theta_k;f) = \frac{\left(\sum_m N_m F_m(\theta_k) G(\theta)\right)^2}{\sum_m \frac{F_m(\theta_k) F_m(\theta_k) N_m G(\theta)}{F_m(\theta)} \sum_m N_m F_m(\theta) G(\theta)}$$

The function $F_m(f)$ is the transfer function for the combination of filters 501, 502, 503. The function $G_m(f_i)$ is the transfer function for an SC filter 503, where the subscript "m" denotes the subarray with which the SC filter 503 is associated. $N_m$ is the number of channels in the $m^{th}$ subarray. $M_{sub}$ is the number of subarrays. The mis-match function is equal to 1 when the actual beam angle $\theta_k$ is the same as the angle θ used in the SC filters 503. By determining limits on the amount of mis-match loss that is acceptable, the outer bounds of each sector may be determined. In one embodiment of the present invention, this determination is made graphically. Alternatively, the determination is made by trial and error or through numerical solution of two roots of the mis-match equation for the maximum loss starting at an arbitrary bearing. Since the mis-match loss will be greater at higher frequencies, the mis-match loss is preferably calculated at the highest frequency of interest.

Figure 9:
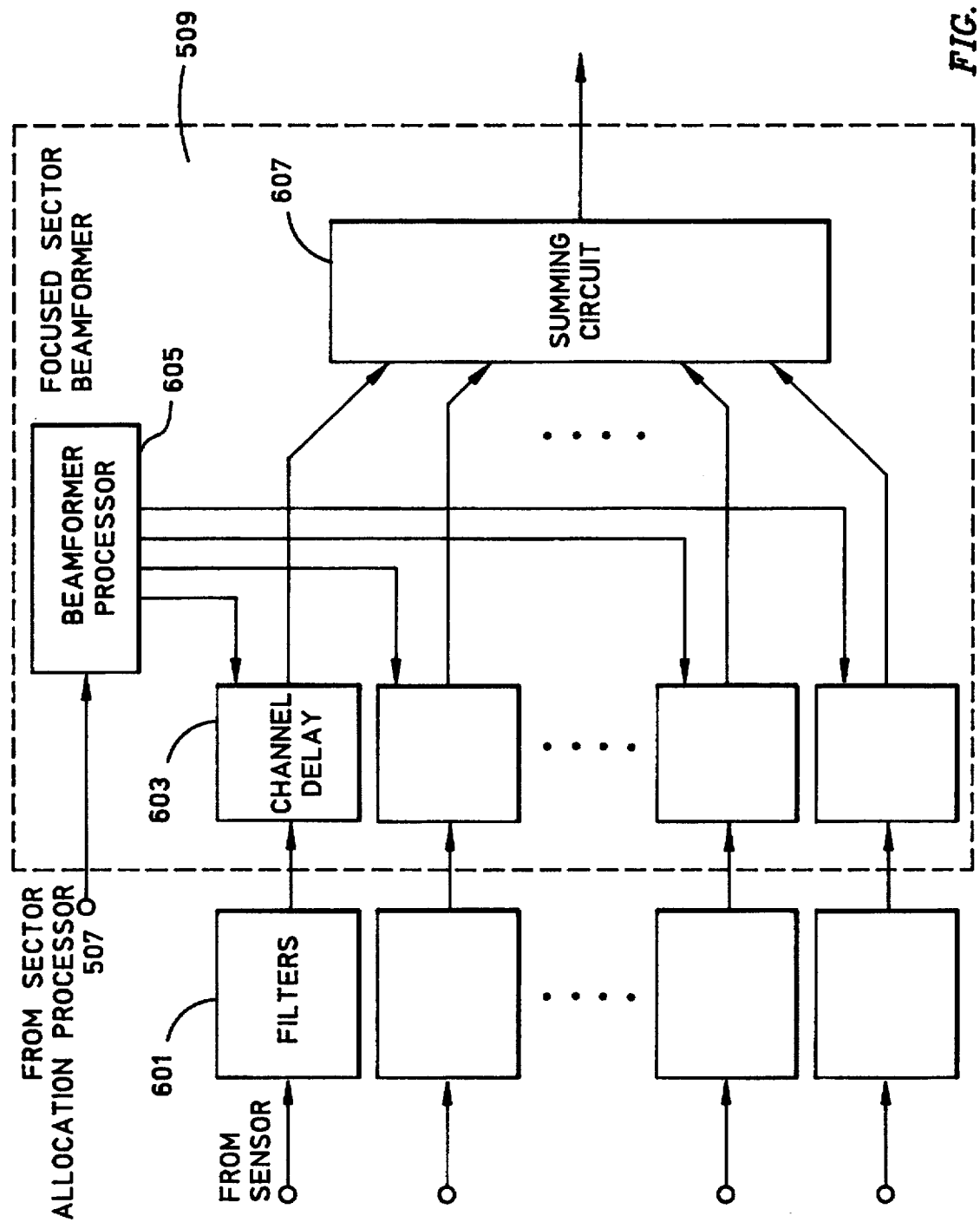
FIG. 9 is a functional block diagram of a beamformer in accordance with one embodiment of the present invention.

In accordance with one embodiment of the present invention, once each channel has been filtered by the associated NC filter 501, the associated SpC filter 502, and the associated SC filter 503, the output of each SC filter 503 is coupled to the focused sector beamformer 509. The beamformer 509 is preferably capable of: (1) processing non-uniformly spaced sensors; (2) processing broadband signals; (3) computing beams at any specified beam spacing; (4) computing beams in one sector of bearing angles; (5) focusing the beamforming to account for wavefront curvature. The beamformer 509 calculates the beams by applying a time-delay to each of the channels and summing the channels. Since all the special weighing has been done prior to beamforming, all the channels are preferably given equal weight in the beamforming process. FIG. 9 is a functional block diagram of a beamformer 505 in accordance with one embodiment of the present invention. The beamformer 505 includes a plurality of programmable channel delays 603, preferably equal in number to the number of sensors 101 (see FIG. 2) in the sensor array 201. Each delay 603 is associated with a unique one of the sensors 101. The beamformer 505 also includes a beamformer processor 605 and a summing circuit 607.

In one embodiment of the present invention, the beamformer processor 605 calculates the distance from each sensor 101 to a first point in space. By determining the difference between the distance of the closest sensor 101 to the point and the distance of each other sensor 101 to that point, a delay associated with each sensor 101 is calculated. This delay is then used to program each of the channel delays 603. The output from each channel delay 603 is then coupled to the summing circuit 607 and summed. This output is used to display one pixel of information. The process is repeated for each other pixel of interest (i.e., to determine information regarding targets at other locations in space).

In accordance with one embodiment of the present invention, focusing is performed by the beamformer 509 whenever the range to the target is less than the standard criterion of $L^2/\lambda$, where L is the length of the entire array (encompassing all subapertures) and λ is the acoustic wavelength at the highest frequency of interest. In accordance with the present invention, focusing is required at a longer range than is required for the same array used in a conventional narrowband system, since the highest frequency of interest for aperture of length L is higher than in conventional systems. Accordingly, λ will be smaller. Focusing is preferably performed over at least part of the range of interest. The number of focus points is determined by standard depth and width of field criteria found in conventional nearfield beamforming art.

The beamformer 509 computes focused beams over the sector determined by the SA processor 507 (see FIG. 5) at angular increments consistent with the 3 dB beamwidth resolution given by (c/L) $f_{max}$, where $f_{max}$ is the highest frequency processed, L is the length of the entire array (encompassing all subapertures), and c is the speed of sound in the medium surrounding the array. That is, the SA processor 507 determines for which points the delays are to be calculated by the beamformer processor 605. In accordance with one embodiment of the present invention, a conventional post-processor 511 is coupled to the output of the beamformer 509. The output of the post-processor is preferably coupled to a conventional display device 513. In an alternative embodiment of the present invention, a buffer memory holds the output from the sensors 101 until requested by the beamformer processor 605. Once the output from the sensors 101 is filtered, the output from one or both of the filters 501, 503 is again buffered. These buffers allow sufficient information to be processed at each functional stage before being coupled to the next functional stage.

Figure 4:
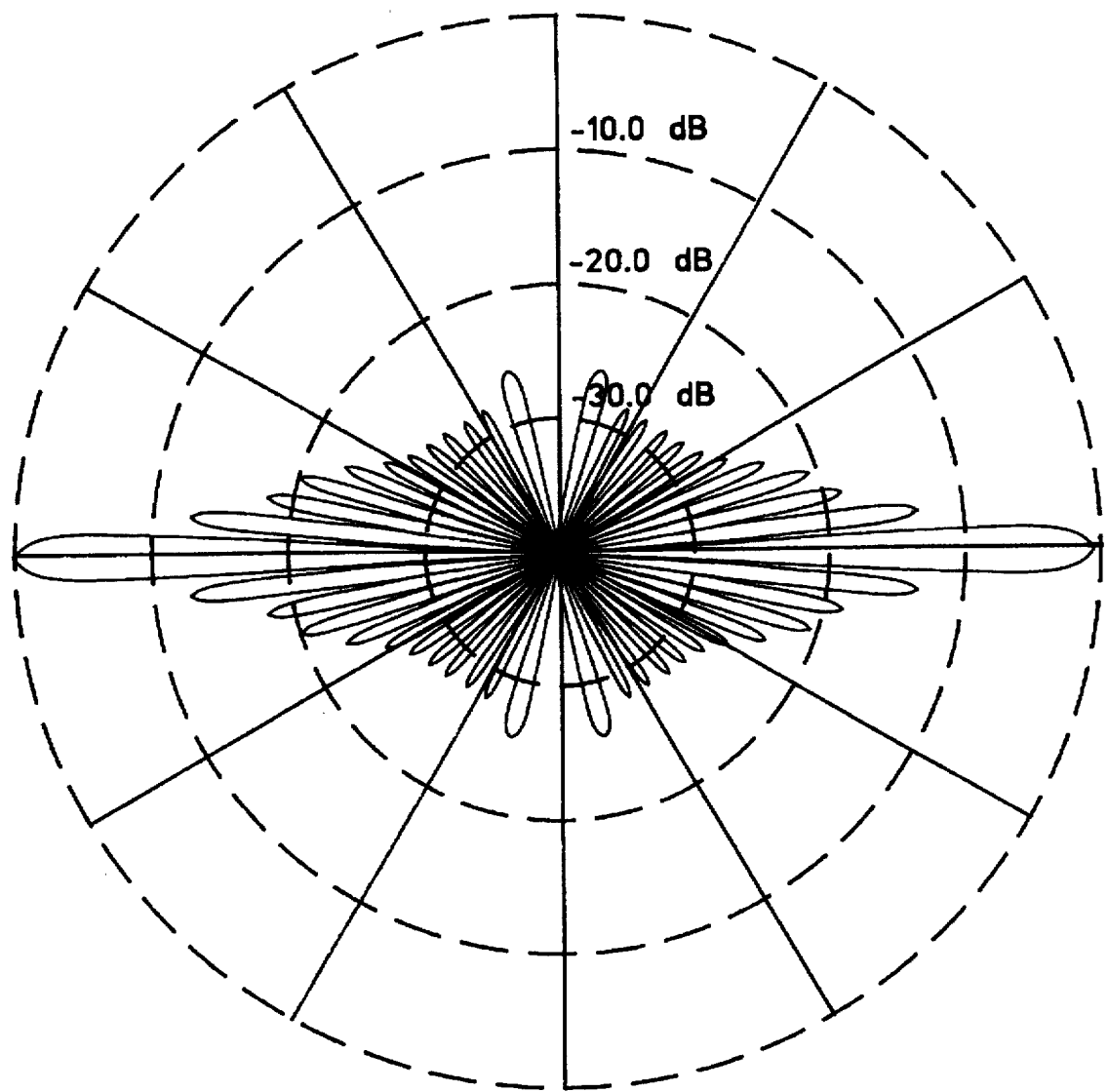
FIG. 4 is a graphical representation of the gain vs. azimuth for a prior art system, such as the system shown in FIGS. 2–3.
Figure 10:
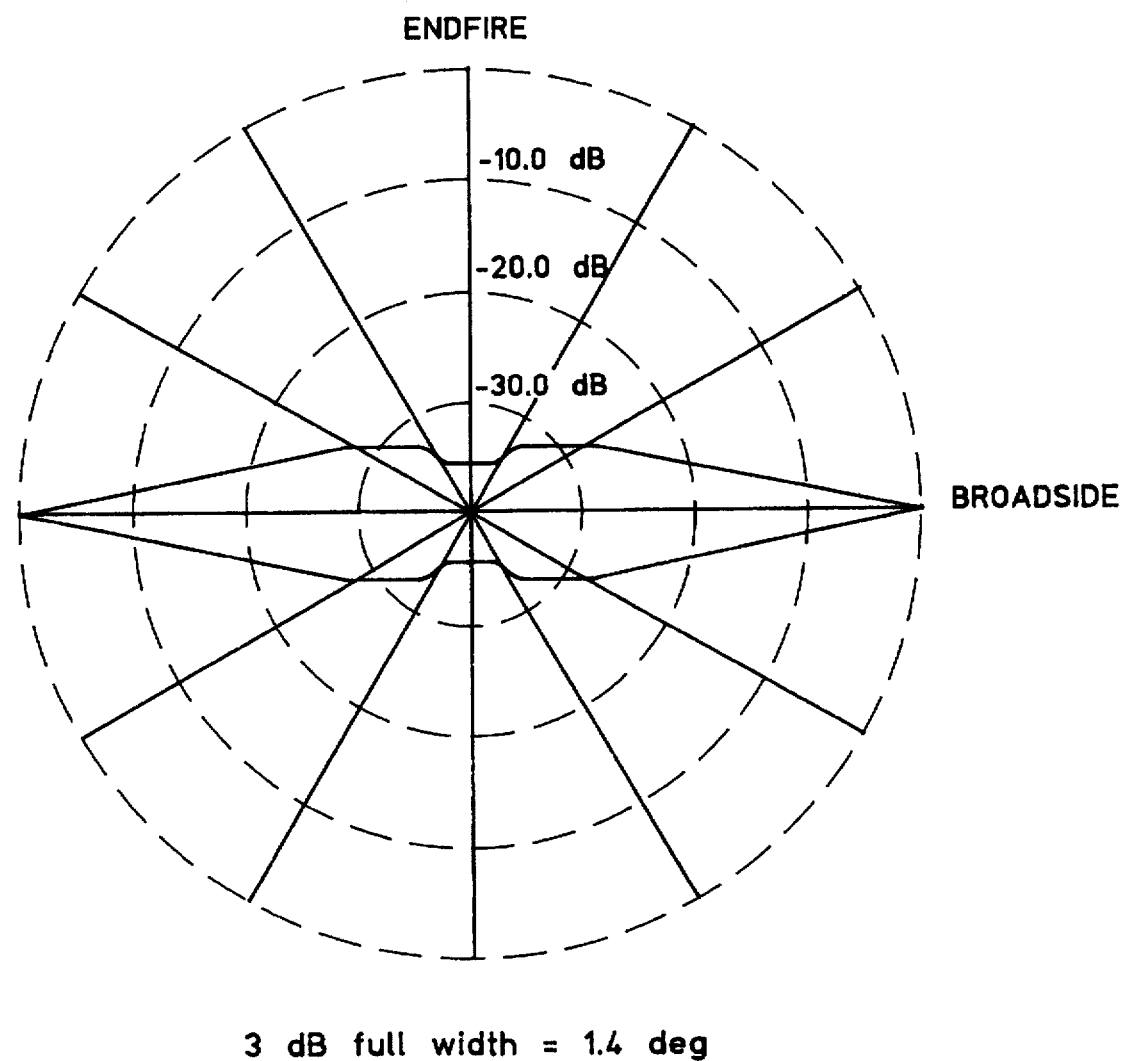
FIG. 10 is a graph of the beampattern response for a broadside beam for the broadband system of the present invention.

FIG. 10 is a graph of the directivity of the broadband system of the present invention. It will be clear from a comparison of the beampattern shown in FIG. 10 and FIG. 4 that the preferred embodiment of the present invention provides a beampattern that has superior directivity over the beam pattern provided by prior art narrowband systems. That is, the present invention provides far greater azmithal resolution (a narrower beampattern near broadside), and superior sidelobes.

Figure 11:
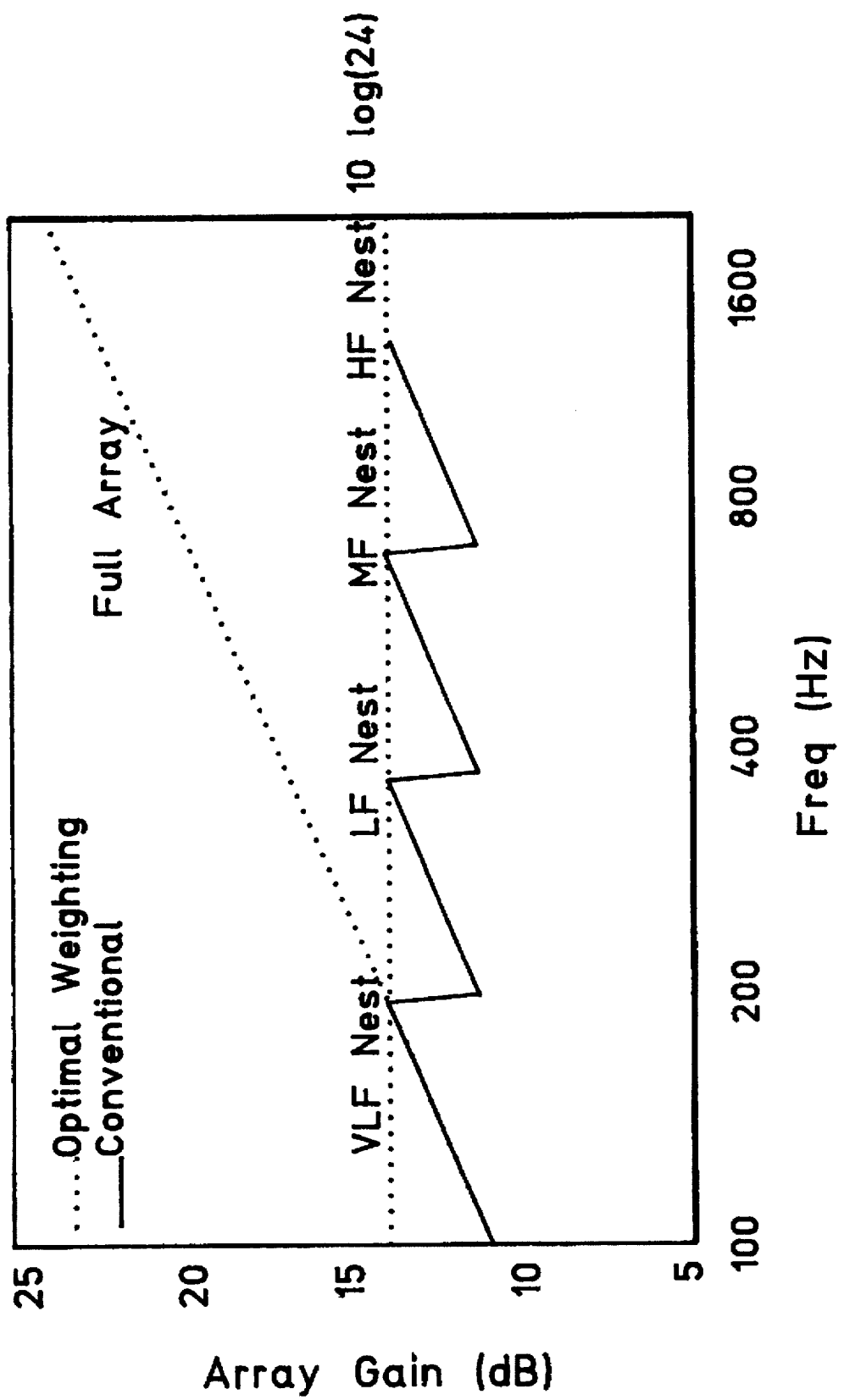
FIG. 11 is a graph of array gain verses frequency for both the present invention and a prior art sonar system.

FIG. 11 is a graph of array gain verses frequency for broadside beams for both the present invention and a prior art sonar system. The curve representing the array gain of the present invention 701 clearly indicates higher gain than the array gain curve 703 of prior art systems for the frequencies above the design frequency of the first subarray (i.e., above 200 Hz).

Description of the Apparatus of the Present Invention

Figure 12:
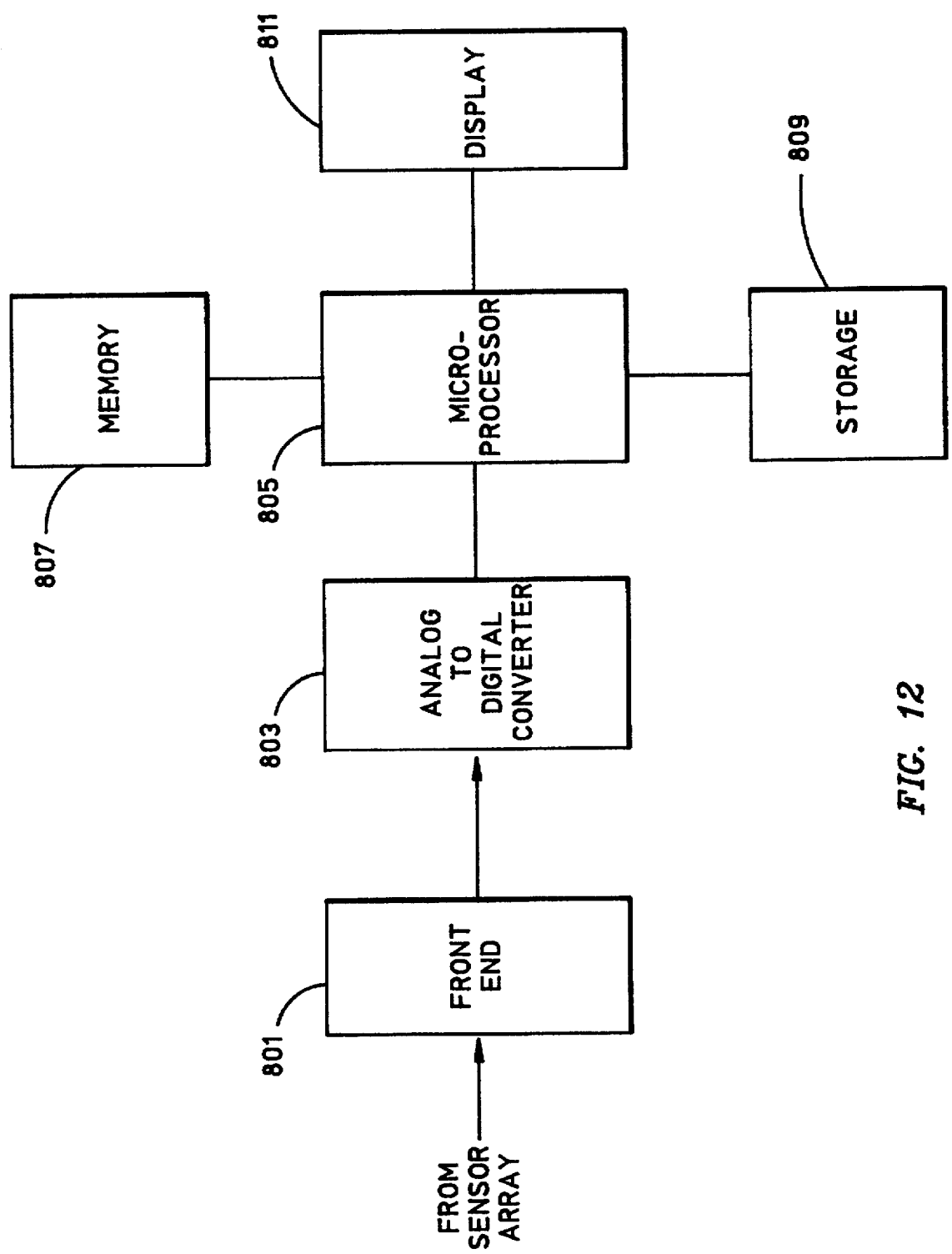
FIG. 12 is an illustration of one embodiment of the apparatus used to implement the present invention.

FIG. 12 is an illustration of one embodiment of the apparatus used to implement the present invention. A front end section 801 receives analog electrical signals from each sensor 101 of the sensor array. In one embodiment of the present invention, the outputs from each sensor of the same sensor group are summed together in phase to generate a channel output signal in conventional manner. The front end section 801 includes pre-amplifiers, filters, and other conventional signal conditioning circuitry well known in the art. Each channel output signal is then coupled to an analog to digital converter (A/D) 803. The signals coupled to the A/D 803 are digitized in conventional fashion. The output from the A/D 803 is a plurality of digital data streams. Each digital data stream output from the A/D 803 preferably is the digital representation of one channel output signal. These digital data streams are preferably coupled to a microprocessor 805.

In one embodiment of the present invention, the microprocessor 805 initially stores the received digital information associated with each channel in a memory 807 to allow a sufficient amount of information to be received from the sensor array before processing the information. Alternatively, the microprocessor 805 begins processing the information as the information is received. Processing of the information includes applying the transfer function of the NC filter 501 to the received digital information of each channel. The output from each sensor 101 associated with the same subarray 203, 205, 207 is filtered using the same transfer function. As described above, the transfer functions applied to channels of different subarrays 203, 205, 207 differ due to the difference in the spacing of the sensors 101. Application of the NC filter transfer function is preferably performed one sensor output signal at a time or currently (i.e., multiplexed in time). Alternatively, the NC filter function may be performed on a plurality of sensor output signals simultaneously by multiple microprocessors operating in parallel. Since the NC filter function is identical for any particular beam angle, the NC filter function need only be applied once for any particular series of received signal.

The microprocessor 805 also performs the SC filter function on each sensor output signal after conversion to a digital sensor output signal by the A/D 803. As stated above, the SC filter transfer function depends upon the beam angle, as indicated by an input calculated by the SA processor 507. In one embodiment of the present invention, the SA processor function described above is performed by the microprocessor 805. That is, the microprocessor 805 determines the beam angle to be processed by the SC filters 503 and the beamformer 509. Angles that are within a particular range of values, (i.e., a "beam sector"), preferably cause a single value to be output from the SA processor 507. The value of the beam sector is then used within the SC filter transfer function to determine the transfer function for each direction of the beam. That is, the microprocessor 805 calculates the proper value to be used in the transfer function of the SC filter 503 based upon the direction of the beam. This process is preferably done one sensor output signal at a time. However, in an alternative embodiment of the present invention, parallel processors may be used to process more than one sensor output signal simultaneously. It should be clear that in order to process the information for more than one beam sector, the same output from the NC filters 501 must be applied to the SC filters 503 as many times as there are different beam sectors to be processed.

Since the transfer functions of both the NC filter 501 and the SC filter 503 are linear, the order in which filter transfer functions are applied is not significant. After filtering each channel of digital information, the microprocessor 805 performs the beamforming function by delaying and summing the outputs of each SC filter 503 to determine the signal strength of the broadband beam in each direction. This information may then be stored in a storage device 809, such as magnetic disk storage device. The information is displayed by a display device 811, such as a cathode ray tube monitor.

In an alternative embodiment of the present invention, each of the functions shown in FIG. 5 may be performed by a dedicated processor. In yet another alternative embodiment, one or more of the functions shown in FIG. 5 may be performed by dedicated hardware, Application Specific Integrated Circuits (ASICs), state machines or any other circuitry capable of performing the function.

A number of embodiments of the present invention have been described. Nevertheless, it will be understood that various modifications may be made without departing from the spirit and scope of the invention. For example, both the NC filter and the SC filter may be implemented in any manner that accomplishes the filter function, such as by analog filters using discrete components, digital filters implemented in dedicated processors, or active filters. Furthermore, the present application is described primarily in the context of sonar systems. However, the present invention may be used in any system in which waves are processed in order to detect the nature of objects which either reflect or emit energy. For example, the present invention may be used with free floating arrays, such as a field of sonobuoys, synthetic aperture arrays, broadband transmitter arrays, arrays which are configured other than as one-dimensional towed arrays, air acoustic systems, medical ultra-sound systems, seismic analysis systems, non-destructive testing systems, and many other fields in which distance and azimuth are determined by the relative phase of waves which either reflect off, or emanate from, an object. Accordingly, it is to be understood that the invention is not to be limited by the specific illustrated embodiment, but only by the scope of the appended claims.

I claim:

1. A broadband sonar system configured to be coupled to a conventional narrow band sonar sensor array having a plurality of sensors grouped in subarrays, each of said sensors within a subarray being spaced equidistant from adjacent sensors within said same subarray, including:

(a) a spacing compensation filter, for compensating for differences in the spacing of the plurality of sensors; and (b) a broadband beamformer coupled to the spacing compensation filter, for combining a plurality of input signals received from said spacing filter, for determining at least an azimuth of targets based upon a result of said combining.

2. A broadband sonar system configured to be coupled to a conventional narrow band sonar sensor array having a plurality of sensor groups configured in subarrays, each of said sensor groups within a subarray being spaced equidistant from adjacent sensor groups within the same subarray, including:

(a) a plurality of filters, each filter coupled to a sensor group of said sonar sensor array for compensating for differences in channel noise from subarray to subarray, each filter which is coupled to a sensor group that is part of a first subarray having the same transfer function as each other filter coupled to a sensor group that is part of the first subarray, and each filter coupled to a sensor group that is not part of the first subarray having a different transfer function from each other filter that is coupled to a sensor group that is part of the first subarray;

(b) a broadband beamformer, coupled to each filter, for summing signals received from each filter to generate an output to be displayed to a user which allows the user to determine distance to targets.

3. A broadband sonar system configured to be coupled to a conventional narrow band sonar sensor array having a plurality of sensor groups, each sensor group associated with at least one corresponding subarray, each of said sensor groups corresponding to a subarray being spaced equidistant from each adjacent sensor group corresponding to the same subarray, including:

(a) a plurality of first filters, each first filter coupled to a corresponding sensor group of said sonar sensor array and having a transfer function that varies as a function of frequency and spacing, between sensors of said corresponding subarray, such that said plurality of first filters compensate for differences in frequency dependent channel noise from subarray to subarray;

(b) a plurality of second filters, each second filter coupled to a corresponding first filter for receiving an output from said corresponding first filter, each second filter having a transfer function that is dependent upon a beam angle, frequency, and spacing of said sensors within said subarray corresponding with said first filter coupled to said second filter, such that said plurality of second filters compensate for effects of frequency and subarray spacing on said signal as said beam angle rotates; and (c) a broadband beamformer, coupled to each of said second filters, for summing signals received from each second filter to generate an output to be displayed for determining azimuth of and distance to targets.

4. The system of claim 3, wherein the transfer function of each of said first filters is:

$$N_G/\left\{N_G + 2\sum_{n=1}^{N_G-1}\{(N_G-n)\text{sinc}\{2fn\Delta x/c\}\}\right\}$$

where sinc $a=(\sin \pi a)/(\pi a)$; $\Delta x$ is the distance between each sensor within the sensor group to which the filter is coupled; $N_G$ is a number of sensors in the sensor group to which the filter is coupled; f=a frequency in cycles; and c=the speed of sound through a medium surrounding the array.

5. The system of claim 4, wherein the transfer function of each of said second filters is:

$$(1/N_G)\sum_{n=1}^{N_G} \Sigma e^{-j2\pi(f/c)\sin\theta(x_n-x)};$$

where f is the frequency of an input signal in Hertz, $\theta$ is a bearing of said beam angle relative to broadside, and x is an average of all $x_n$.

6. A broadband beamformer system, configured to be coupled to a narrowband sensor array having at least two subarrays, each subarray having a plurality of sensors equally spaced apart, the spacing of said sensors being different for different subarrays, including:

(a) at least one compensating filter configured to receive an input signal from one of said sensors for compensating for differences in channel noise from subarray to subarray, each filter which is coupled to a sensor that is part of a first subarray having the same transfer function as each other filter coupled to a sensor that is part of the first subarray, and each filter coupled to a sensor that is part of the first subarray having a different transfer function from each other filter that is coupled to a sensor that is part of a subarray other than the first subarray;

(b) a plurality of programmable delays, each programmable delay coupled to one of said compensating filters, for receiving an input signal from one of said compensating filters and generating a delayed output by delaying said input signal a predetermined amount of time;

(c) a beamformer processor, coupled to each programmable delay, for programming said predetermined amount of time;

(d) a summing device, coupled to each programmable delay, for:
(1) receiving a delayed output from each programmable delay;
(2) summing each delayed output together; and
(3) outputting the sum of the delayed outputs.

7. The system of claim 6, wherein each compensating filter includes:

(a) a first noise compensating filter having the following transfer function:

$$N_G/\left\{N_G + 2\sum_{n=1}^{N_G-1}\{(N_G-n)\text{sinc}\{2fn\Delta x/c\}\}\right\}$$

(b) a second signal compensation filter having the following transfer function:

$$(1/N_G)\sum_{n=1}^{N_G} e^{-j2\pi(f/c)\sin\theta(x_n-x)};$$

where sinc $a=(\sin \pi a)/(\pi a)$; $\Delta x$ is the distance between each sensor within the sensor group to which the filter is coupled; No is the number of sensors in each sensor group of said corresponding subarray; $x_n$ is the position of the $n^{th}$ sensor within said sensor group; c is the speed of sound through a medium surrounding said sensors; f is the frequency of an input signal in Hertz, $\theta$ is a bearing of said beam angle relative to broadside, x is the acoustic center of the group, and wherein a positive $\theta$ beam is in the direction of increasing x, and positive Fourier transform convention is used.

8. A broadband sonar system, including
(a) a conventional narrow band sonar sensor array, including:
  (1) a plurality of sensor groups, configured in subarrays, each of said sensor groups within a subarray being spaced equidistant from adjacent sensor groups within the same subarray, including;
    (i) at least one sensor;
(b) a broadband beamformer for calculating and applying a delay to a plurality of input signals received from said conventional narrow band sonar sensor array and then summing each of said input signals, and for determining distance to targets based upon a result of said summing; and
(c) a spacing compensation filter to compensate for differences in the spacing of the plurality of sensors.

9. A broadband sonar system, including:
(a) a conventional narrow band sonar sensor array, including:
  (1) a plurality of sensor groups configured in subarrays, each of said sensor groups within a subarray being spaced equidistant from adjacent sensor groups within the same subarray;
(b) a plurality of filters, each filter coupled to a sensor group of said sonar sensor array for compensating for differences in channel noise from subarray to subarray, each filter coupled to a sensor group used for the same subarray having the same transfer function, and each filter which is coupled to a sensor group that is part of a first subarray having the same transfer function as each other filter coupled to a sensor group which is part of the first subarray, and each filter coupled to a sensor group which is not part of the first subarray having a different transfer function from each filter that is coupled to a sensor group that is part of the first subarray;
(c) a broadband beamformer, coupled to each filter, for summing signals received from each filter to generate an output to be displayed to a user which allows the user to determine distance to targets.

10. A broadband sonar system, including:
(a) a conventional narrow band sonar sensor array including:
  (1) a plurality of sensor groups, each sensor group associated with at least one corresponding subarray, each of said sensor groups corresponding to a subarray being spaced equidistant from each adjacent sensor group corresponding to the same subarray, including:
    (i) at least one sensor;
(b) a plurality of first filters, each first filter coupled to a corresponding sensor group of said sonar sensor array and having a transfer function that varies as a function of frequency and spacing between sensors of said corresponding subarray, such that said plurality of first filters compensate for differences in frequency dependent channel noise from subarray to subarray;
(c) a plurality of second filters, each second filter coupled to a corresponding first filter for receiving an output from said corresponding first filter, each second filter having a transfer function that is dependent upon a beam angle, frequency, and spacing of said sensors within said subarray corresponding with said first filter coupled to said second filter, such that said plurality of second filters compensate for effects of frequency and subarray spacing on said signal as said beam angle rotates; and (d) a broadband beamformer, coupled to each of said second filters, for summing signals received from each second filter to generate an output to be displayed for determining azimuth of and distance to targets.

11. The system of claim 10, wherein the transfer function of each of said first filters is:

$$N_G^2 / \left\{ N_G + 2 \sum_{n=1}^{N_G-1} \{(N_G - n)\text{sinc}\{2fn\Delta x/c\}\} \right\}$$

where sinc a=(sin πa)/(πa); $\Delta x$ is the distance between each sensor within the sensor group to which the filter is coupled; $N_G$ is a number of sensors in the sensor group to which the filter is coupled; f=a frequency in cycles; and c=the speed of sound through a medium surrounding the array.

12. The system of claim 11, wherein the transfer function of each of said second filters is:

$$(1/N_G) \sum_{n=1}^{N_G} \Sigma e^{-i 2\pi (f/c) \sin\theta (x_n - \bar{x})};$$

where f is the frequency of an input signal in Hertz, $\theta$ is a bearing of said beam angle relative to broadside, and x is an average of all $x_n$.

13. A broadband beamformer, including:
(a) a narrowband sensor array, including:
  (1) at least two subarrays, each subarray including:
    (i) a plurality of sensors equally spaced apart, the spacing of said sensors being different for different subarrays;
(b) a plurality of programmable delays, each programmable delay being configured to be coupled to an input signal from one of said sensors, for receiving an input signal from one of said sensors and generating a delayed output by delaying said input signal a predetermined amount of time;
(c) a beamformer processor, coupled to each programmable delay, for programming said predetermined amount of time;
(d) a summing device, coupled to each programmable delay, for:
  (1) receiving a delayed output from each programmable delay;
  (2) summing each delayed output together;
  (3) outputting the sum of the delayed outputs; and
(e) a spacing compensation filter to compensate for differences in the spacing of the plurality of sensors.

14. A broadband beamformer system, configured to be coupled to a narrowband sensor array having at least two subarrays, each subarray having a plurality of sensors equally spaced apart, the spacing of said sensors being different for different subarrays, including:
(a) at least one compensating filter configured to receive an input signal from one of said sensors for compensating for differences in channel noise from subarray to subarray, each filter which is coupled to a sensor that is part of a first subarray having the same transfer function as each other filter coupled to a sensor that is part of the first subarray, and each filter coupled to a sensor that is part of the first subarray having a different transfer function from each other filter that is coupled to a sensor that is part of a subarray other than the first subarray;
(b) a plurality of programmable delays, each programmable delay coupled to one of said compensating filters, for receiving an input signal from one of said compensating filters and generating a delayed output by delaying said input signal a predetermined amount of time;
(c) a beamformer processor, coupled to each programmable delay, for programming said predetermined amount of time;
(d) a summing device, coupled to each programmable delay, for:
(1) receiving a delayed output from each programmable delay;
(2) summing each delayed output together;
(3) outputting the sum of the delayed outputs; and
(e) a spacing compensation filter to compensate for differences in the spacing of the plurality of sensors.

15. The system of claim 14, wherein each compensating filter includes:
(a) a first noise compensating filter having the following transfer function:

$$N_G^{-1} \left\{ N_G + 2 \sum_{n=1}^{N_G-1} \{(N_G-n)\mathrm{sinc}\{2 f n \Delta x/c\}\} \right\}$$

(b) a second signal compensation filter having the following transfer function:

$$(1/N_G) \sum_{n=1}^{N_G} \Sigma e^{-j2\pi(f/c)\sin\theta(x_n-x)};$$

where sinc $a=(\sin \pi a)/(\pi a)$; $\Delta x$ is the distance between each sensor within the sensor group to which the filter is coupled; $N_G$ is the number of sensors in each sensor group of said corresponding subarray; $x_n$ is the position of the $n^{th}$ sensor within said sensor group; c is the speed of sound through a medium surrounding said sensors; f is the frequency of an input signal in Hertz, $\theta$ is a bearing of said beam angle relative to broadside, x is the accoustic center of the group, and wherein a positive $\theta$ beam is in the direction of increaseing x, and positive Fourier transform convention is used.

16. A method, performed by a broadband sonar system, for generating an output signal to be displayed to determining azimuth of, and distance to, targets, including the steps of:
receiving acoustic signals from a first subarray of sensor groups, wherein each sensor group of said first subarray is spaced a first predetermined distance from each adjacent sensor group of said first subarray;
receiving acoustic signals from a second subarray of sensor groups, wherein each sensor group of said second subarray is spaced a second predetermined distance from each adjacent sensor group of said second subarray, said second predetermined distance differing from said first predetermined distance;
applying each acoustic signal received from said first subarray to a first filter function having a transfer function that varies as a function of frequency and spacing of said sensor groups within said first subarray;
applying each acoustic signal received from said second subarray to said first filter function;
applying each acoustic signal received from said first subarray to a second filter function having a transfer function that is dependent upon a beam angle, frequency, and spacing of said sensor groups within said first subarray;
applying each acoustic signal received from said second subarray to said second filter function;
calculating a delay to be applied to each acoustic signal received from each sensor group of each subarray; and
generating a sum output signal by summing each acoustic signal with each other acoustic signal to generate said sum output signal to be displayed.

17. The method of claim 16, wherein:
(a) the transfer function of the first filter function is:

$$N_G^{-1} \left\{ N_G + 2 \sum_{n=1}^{N_G-1} \{(N_G-n)\mathrm{sinc}\{2 f n \Delta x/c\}\} \right\}$$

(b) the transfer function of the second filter function is:

$$(1/N_G) \sum_{n=1}^{N_G} \Sigma e^{-j2\pi(f/c)\sin\theta(x_n-x)};$$

where sinc $a=(\sin \pi a)/(\pi a)$; $\Delta x$ is the distance between each sensor within the sensor group to which the filter is coupled; $N_G$ is the number of sensors in each sensor group of said corresponding subarray; $x_n$ is the position of the $n^{th}$ sensor within said sensor group; c is the speed of sound through a medium surrounding said sensors; f is the frequency of an input signal in Hertz, $\theta$ is a bearing of said beam angle relative to broadside, x is the accoustic center of the group, and wherein a positive $\theta$ beam is in the direction of increaseing x, and positive Fourier transform convention is used.

18. A method, performed by a broadband sonar system, for generating an output signal to be displayed to determining distance to targets, including the steps of:
receiving signals from a first subarray of sensor groups, wherein each sensor group of said first subarray is spaced a first predetermined distance from each adjacent sensor group of said first subarray;
receiving signals from a second subarray of sensor groups, wherein each sensor group of said second subarray is spaced a second predetermined distance from each adjacent sensor group of said second subarray, said second predetermined distance differing from said first predetermined distance;
filtering the signals received from the first and second subarray of said sensor groups to compensate for the difference between the first predetermined distance and the second predetermined distance;
calculating a delay to be applied to each acoustic signal received from each sensor group of each subarray to determine a pixel of information; and
generating a pixel sum output signal by summing each acoustic signal with each other acoustic signal to generate said sum output signal to be displayed.

19. A broadband sonar system configured to be coupled to a conventional narrow band sonar sensor array having a plurality of sensor groups configured in subarrays, each of said sensor groups within a subarray being spaced equidistant from adjacent sensor groups within said same subarray, including:
(a) a plurality of noise compensation filters, each coupled to one of the sensor groups, for receiving signals from a sensor group and compensating for differences in the amount of channel noise generated as a consequence of differences in the configuration of each sensor group to which each filter is coupled; and (b) a broadband beamformer coupled to each noise compensation filter, for combining a plurality of input signals received from each said noise compensation filter, for determining distance to targets based upon a result of said combining.

20. The broadband sonar system of claim 19, wherein each of the plurality of filters has a transfer function of:

$$N_G^2 / \left\{ N_G + 2 \sum_{n=1}^{N_G-1} \{(N_G - n)\text{sinc}\{2fn\Delta x/c\}\} \right\}$$

where sinc $a = (\sin \pi a)/(\pi a)$; $\Delta x$ is the distance between each sensor within the sensor group to which the filter is coupled; $N_G$ is a number of sensors in the sensor group to which the filter is coupled; f=a frequency in cycles; and c=the speed of sound through a medium surrounding the array.

21. A broadband sonar system configured to be coupled to a conventional narrow band sonar sensor array having a plurality of sensor groups configured in subarrays, each of said sensor groups within a subarray being spaced equidistant from adjacent sensor groups within the same subarray, including:

(a) a plurality of filters, each filter coupled to a sensor group of said sonar sensor array for compensating for differences in the relative spacing of each sensor group to which each filter is coupled, each filter which is coupled to a sensor group that is part of a first subarray having the same transfer function as each other filter coupled to a sensor group that is pan of the first subarray, and each filter coupled to a sensor group that is not pan of the first subarray having a different transfer function from each other filter that is coupled to a sensor group that is pan of the first subarray;

(b) a broadband beamformer, coupled to each filter, for summing signals received from each filter to generate an output to be displayed to a user which allows the user to determine distance to targets.

22. The broadband sonar system of claim 19, wherein each of the plurality of filters has a transfer function of:

$$N_{SA} / \left\{ N_{SA} + 2 \sum_{n=1}^{N_{SA}-1} (N_{SA} - n)\cos(2\pi n U \Delta X)\text{sinc}\left( \frac{2\pi f}{c} \Delta X \right) \right\} ;$$

where $N_{SA}$=number of channels in a subarray; $\Delta X$=spacing of the channels in the subarray; $U=(f/c) \sin \theta$; $\theta$=the beam angle with respect to broadside.

23. A broadband sonar system configured to be coupled to a conventional narrow band sonar sensor array having a plurality of sensor groups, each sensor group associated with at least one corresponding subarray, each of said sensor groups corresponding to a subarray being spaced equidistant from each adjacent sensor group corresponding to the same subarray, including:

(a) a plurality of first filters, each first filter coupled to a corresponding sensor group of said sonar sensor array and having a transfer function that varies as a function of frequency and spacing between sensors of said corresponding subarray, such that said plurality of first filters compensate for differences in frequency dependent channel noise from subarray to subarray;

(b) a plurality of second filters, each second filter coupled to a corresponding first filter for receiving an output from said corresponding first filter, each second filter having a transfer function that depends upon the relative spacing of the sensor groups; and (c) a broadband beamformer, coupled to each of said second filters, for summing signals received from each second filter to generate an output to be displayed for determining distance to targets.

24. A broadband sonar system configured to be coupled to a conventional narrow band sonar sensor array having a plurality of sensor groups, each sensor group associated with at least one corresponding subarray, each of said sensor groups corresponding to a subarray being spaced equidistant from each adjacent sensor group corresponding to the same subarray, including:

(a) a plurality of first filters, each first filter coupled to a corresponding sensor group of said sonar sensor array and having a transfer function that varies as a function of the relative spacing of the sensor groups;

(b) a plurality of second filters, each second filter coupled to a corresponding first filter for receiving an output from said corresponding first filter, each second filter having a transfer function that is dependent upon a beam angle, frequency, and spacing of said sensors within said subarray corresponding with said first filter coupled to said second filter, such that said plurality of second filters compensate for effects of frequency and subarray spacing on said signal as said beam angle rotates; and (c) a broadband beamformer, coupled to each of said second filters, for summing signals received from each second filter to generate an output to be displayed for determining distance to targets.

25. A broadband sonar system configured to be coupled to a conventional narrow band sonar sensor array having a plurality of sensor groups, each sensor group associated with at least one corresponding subarray, each of said sensor groups corresponding to a subarray being spaced equidistant from each adjacent sensor group corresponding to the same subarray, including:

(a) a plurality of first filters, each first filter coupled to a corresponding sensor group of said sonar sensor array and having a transfer function that varies as a function of frequency and spacing between sensors of said corresponding subarray, such that said plurality of first filters compensate for differences in frequency dependent channel noise from subarray to subarray;

(b) a plurality of second filters, each second filter coupled to a corresponding one of the first filters, and having a transfer function that is dependent upon a beam angle and frequency of signals received by the sensors for compensating for differences in the spacing of the sensors;

(c) a plurality of third filters, each third filter coupled to a corresponding second filter for receiving an output from said corresponding second filter, each third filter having a transfer function that is dependent upon a beam angle, frequency, and spacing of said sensors within said subarray corresponding with said first filter coupled to said second filter, such that said plurality of third filters compensate for effects of frequency and subarray spacing on said signal as said beam angle rotates; and (d) a broadband beamformer, coupled to each of said third filters, for summing signals received from each second filter to generate an output to be displayed for determining distance to targets.

26. The broadband sonar system of claim 25, wherein the second filter has a transfer function of:

$$N_{SA} / \left\{ N_{SA} + 2 \sum_{n=1}^{N_{SA}-1} (N_{SA} - n)\cos(2\pi n U \Delta X)\mathrm{sinc}\left(\frac{2\pi f}{c} \Delta X\right) \right\};$$

where $N_{SA}$=number of channels in a subarray; $\Delta x$=distance between each channel in the subarray; $U=(f/c) \sin \theta$; $\theta$=the beam angle with respect to broadside.

27. A broadband sonar system, including:

(a) a conventional narrow band sonar sensor array, including:

(1) a plurality of sensor groups configured in subarrays, each of said sensor groups within a subarray being spaced equidistant from adjacent sensor groups within the same subarray;

(b) a plurality of first filters, each first filter coupled to a sensor group of said sonar sensor array for compensating for differences in channel noise from subarray to subarray, each first filter coupled to a sensor group used for the same subarray having the same transfer function, and each first filter which is coupled to a sensor group that is part of a first subarray having the same transfer function as each other filter coupled to a sensor group which is part of the first subarray, and each filter coupled to a sensor group which is not part of the first subarray having a different transfer function from each filter that is coupled to a sensor group that is part of the first subarray;

(c) at least one second filter, each second filter coupled to a corresponding one of the first filters, for compensating for the difference in the spacing between the sensor groups of the each subarray;

(d) a broadband beamformer, coupled to each second filter, for summing signals received from each second filter to generate an output to be displayed to a user which allows the user to determine distance to targets.

28. A broadband sonar system, including:

(a) a conventional narrow band sonar sensor array, including:

(1) a plurality of sensor groups configured in subarrays, each of said sensor groups within a subarray being spaced equidistant from adjacent sensor groups within the same subarray;

(b) a plurality of first filters, each first filter coupled to a corresponding sensor group of said sonar sensor array and having a transfer function that varies as a function of frequency and spacing between sensors of said corresponding subarray, such that said plurality of first filters compensate for differences in frequency dependent channel noise from subarray to subarray;

(c) a plurality of second filters, each second filter coupled to a corresponding one of the first filters, and having a transfer function that is dependent upon a beam angle and frequency of signals received by the sensors for compensating for differences in the spacing of the sensors;

(d) a plurality of third filters, each third filter coupled to a corresponding second filter for receiving an output from said corresponding second filter, each third filter having a transfer function that is dependent upon a beam angle, frequency, and spacing of said sensors within said subarray corresponding with said first filter coupled to said second filter, such that said plurality of third filters compensate for effects of frequency and subarray spacing on said signal as said beam angle rotates; and (e) a broadband beamformer, coupled to each of said third filters, for summing signals received from each second filter to generate an output to be displayed for determining distance to targets.

29. A broadband sonar system, including:

(a) a conventional narrow band sonar sensor array, including:

(1) a plurality of sensor groups configured in subarrays, each of said sensor groups within a subarray being spaced equidistant from adjacent sensor groups within the same subarray;

(b) a plurality of noise compensation filters, each coupled to one of the sensor groups, for receiving signals from a sensor group and compensating for differences in the amount of channel noise generated as a consequence of differences in the configuration of each sensor group to which each filter is coupled; and (c) a broadband beamformer coupled to each noise compensation filter, for combining a plurality of input signals received from each said noise compensation filter, for determining an distance to targets based upon a result of said combining.

30. A broadband sonar system, including:

(a) a conventional narrow band sonar sensor array, including:

(1) a plurality of sensor groups configured in subarrays, each of said sensor groups within a subarray being spaced equidistant from adjacent sensor groups within the same subarray;

(b) a plurality of filters, each filter coupled to a sensor group of said sonar sensor array for compensating for effects of the sensor group to which that filter is coupled, each filter which is coupled to a sensor group that is part of a first subarray having the same transfer function as each other filter coupled to a sensor group that is part of the first subarray, and each filter coupled to a sensor group that is not part of the first subarray having a different transfer function from each other filter that is coupled to a sensor group that is part of the first subarray;

(c) a broadband beamformer, coupled to each filter, for summing signals received from each filter to generate an output to be displayed to a user which allows the user to determine distance to targets.

31. A broadband sonar system, including:

(a) a conventional narrow band sonar sensor array, including:

(1) a plurality of sensor groups configured in subarrays, each of said sensor groups within a subarray being spaced equidistant from adjacent sensor groups within the same subarray;

(b) a plurality of filters, each filter coupled to a sensor group of said sonar sensor array for compensating for differences in the relative spacing of each sensor group to which each filter is coupled, each filter which is coupled to a sensor group that is part of a first subarray having the same transfer function as each other filter coupled to a sensor group that is part of the first subarray, and each filter coupled to a sensor group that is not part of the first subarray having a different transfer function from each other filter that is coupled to a sensor group that is part of the first subarray;

(c) a broadband beamformer, coupled to each filter, for summing signals received from each filter to generate an output to be displayed to a user which allows the user to determine distance to targets.

32. A method, performed by a broadband sonar system, for generating an output signal to be displayed to determining distance to targets, including the steps of:

receiving acoustic signals from a first subarray of sensor groups, wherein each sensor group of said first subarray is spaced a first predetermined distance from each adjacent sensor group of said first subarray;

receiving acoustic signals from a second subarray of sensor groups, wherein each sensor group of said second subarray is spaced a second predetermined distance from each adjacent sensor group of said second subarray, said second predetermined distance differing from said first predetermined distance;

applying each acoustic signal received from said first subarray to a first filter function having a transfer function that varies as a function of frequency and spacing of said sensor groups within said first subarray;

applying each acoustic signal received from said second subarray to said first filter function;

applying each acoustic signal received from said second subarray to a second filter having a transfer function that compensates for the difference between the first predetermined distance and the second predetermined distance;

applying each acoustic signal received from said first subarray to a third filter function having a transfer function that is dependent upon a beam angle, frequency, and spacing of said sensor groups within said first subarray;

applying each acoustic signal received from said second subarray to said third filter function;

calculating a delay to be applied to each acoustic signal received from each sensor group of each subarray; and generating a sum output signal by summing each acoustic signal with each other acoustic signal to generate said sum output signal to be displayed.

33. The method of claim 32, wherein the second filter has a transfer function of:

$$N_{SA} / \left\{ N_{SA} + 2 \sum_{n=1}^{N_{SA}-1} (N_{SA} - n)\cos(2\pi n U \Delta X) \text{sinc}\left(\frac{2\pi f}{c} \Delta X\right) \right\};$$

where $N_{SA}$=number of channels in a subarray; $\Delta X$=spacing of the channels in the subarray; $U=(f/c)\sin\theta$; $\theta$=the beam angle with respect to broadside.

34. A method for combining broadband signals received from a plurality of sensors arranged to form subarrays to determine the range to targets, including the steps of:

receiving broadband signals from said plurality of sensors;

applying the received signals to at least a first filter having an output to compensate for the relative spacing of the plurality of sensors;

combining said output from each filter to generate a single output signal containing information received by said sensors within each of said subarrays, said output signal being indicative of range to said targets.

35. A method for combining broadband signals received from a plurality of sensors arranged to form subarrays to determine the range to targets, including the steps of:

receiving broadband signals from said plurality of sensors;

applying the received signals to at least a first filter having an output to compensate for channel noise, wherein the channel noise is dependent upon the configuration of the sensors;

combining said output from each filter to generate a single output signal containing information received by said sensors within each of said subarrays, said output signal being indicative of range to said targets.

* * * * *